United States Patent
Ochiai et al.

(10) Patent No.: US 7,237,015 B1
(45) Date of Patent: Jun. 26, 2007

(54) SYSTEM FOR SETTING LOCATION INFORMATION IN A DEVICE ON A NETWORK

(75) Inventors: Masato Ochiai, Yokohama (JP); Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 09/612,946

(22) Filed: Jul. 10, 2000

(30) Foreign Application Priority Data

| Jul. 16, 1999 | (JP) | ................................ 11-202737 |
| Jul. 16, 1999 | (JP) | ................................ 11-202738 |
| Jul. 16, 1999 | (JP) | ................................ 11-202739 |
| Jul. 16, 1999 | (JP) | ................................ 11-203642 |

(51) Int. Cl.
*G06F 15/173* (2006.01)
*G06F 15/177* (2006.01)

(52) U.S. Cl. ........................ 709/223; 709/220; 709/221

(58) Field of Classification Search ................. 709/223, 709/220, 221; 707/3, 10; 715/734, 735
See application file for complete search history.

(56) References Cited

U.S. PATENT DOCUMENTS

| 5,261,044 A | * | 11/1993 | Dev et al. ................... 715/855 |
| 5,295,244 A | * | 3/1994 | Dev et al. ................... 345/853 |
| 5,353,399 A | * | 10/1994 | Kuwamoto et al. ......... 709/224 |
| 5,394,522 A | * | 2/1995 | Sanchez-Frank et al. ... 709/223 |
| 5,504,921 A | * | 4/1996 | Dev et al. ................... 709/223 |
| 5,764,911 A | * | 6/1998 | Tezuka et al. ............... 709/223 |
| 5,793,974 A | * | 8/1998 | Messinger .................. 709/223 |
| 5,809,265 A | * | 9/1998 | Blair et al. .................. 345/764 |
| 5,831,610 A | * | 11/1998 | Tonelli et al. ............... 715/735 |
| 5,831,618 A | * | 11/1998 | Fuji et al. .................... 345/853 |
| 5,878,420 A | * | 3/1999 | de la Salle .................. 707/10 |
| 6,047,320 A | * | 4/2000 | Tezuka et al. ............... 709/223 |

(Continued)

FOREIGN PATENT DOCUMENTS

| JP | 05-323867 | 7/1993 |
| JP | 06-324823 | 11/1994 |
| JP | 07/336778 | 12/1995 |
| JP | 08-305520 | 11/1996 |
| JP | 09-244860 | 9/1997 |
| JP | 09-251434 | 9/1997 |
| JP | 09-326799 | 12/1997 |
| JP | 10-320341 | 4/1998 |

OTHER PUBLICATIONS

J. Case, K. McCloghrie, M.Rose, and S.Waldbusser, Management Information base for Version 2 of the Simple Network Management Protocol (SNMPv2), Jan. 1996, RFC 1907.*

*Primary Examiner*—Glenton B. Burgess
*Assistant Examiner*—Aaron Strange
(74) *Attorney, Agent, or Firm*—Fitzpatrick, Cella, Harper & Scinto

(57) ABSTRACT

Location information of each device connected to a network is managed in a hierarchical structure to display the location of each device in a manner easy to be recognized by a user. The location information of each device connected to the network is managed in the hierarchical structure and layout bit maps are stored in each client. When a client issues a device search request, the hierarchical location of the device whose location search was requested can be identified, and the identified location of the device can be displayed in a way to be easily recognized. If the layout bit map corresponding to the search result does not exists, the device can be displayed and registered through visual operations at a desired position. When the client displays the map information, it is unnecessary for a sever to transmit the map information to the client.

9 Claims, 45 Drawing Sheets

U.S. PATENT DOCUMENTS

| | | | |
|---|---|---|---|
| 6,070,242 A * | 5/2000 | Wong et al. | 709/229 |
| 6,100,812 A | 8/2000 | Tanaka et al. | 340/825.37 |
| 6,124,855 A * | 9/2000 | Sells | 345/866 |
| 6,229,540 B1 * | 5/2001 | Tonelli et al. | 709/220 |
| 6,353,848 B1 * | 3/2002 | Morris | 709/203 |
| 6,393,478 B1 * | 5/2002 | Bahlmann | 709/224 |
| 6,430,614 B1 * | 8/2002 | Cucchiara | 709/223 |
| 6,460,032 B1 * | 10/2002 | Ludtke | 707/3 |
| 6,480,863 B1 * | 11/2002 | Scheifler et al. | 707/103 R |
| 6,480,889 B1 * | 11/2002 | Saito et al. | 709/220 |
| 6,496,208 B1 * | 12/2002 | Bernhardt et al. | 345/853 |
| 6,621,589 B1 * | 9/2003 | Al-Kazily et al. | 358/1.15 |
| 6,625,646 B1 * | 9/2003 | Kamanaka et al. | 709/224 |
| 6,650,347 B1 * | 11/2003 | Nulu et al. | 715/853 |
| 6,789,090 B1 * | 9/2004 | Miyake et al. | 707/104.1 |
| 6,839,747 B1 * | 1/2005 | Blumenau et al. | 709/223 |
| 2001/0052995 A1 | 12/2001 | Idehara | 358/1.15 |
| 2003/0217137 A1 * | 11/2003 | Roese et al. | 709/223 |

* cited by examiner

| | | | | | |
|---|---|---|---|---|---|
| 801 — NM | LBP1110 | MFP6550 | LBP3310 | LBP3310 | SCN2160 |
| 802 — MAP | — | 5X+30Y | 10X+10Y | 15X+25Y | 5X+5Y |
| 803 — DV | PRINTER | MFP | PRINTER | PRINTER | SCANER |
| 804 — BL | — | 2-1 | 2-2 | 1-1 | 1-2 |
| 805 — FL | — | 2F | 2F | 1F | 1F |
| 806 — BU | — | AA BUILDING | AA BUILDING | AA BUILDING | AA BUILDING |
| 807 — OP | — | EXTEND | EXTEND | EXTEND | EXTEND |
| 808 — BR | — | TOKYO BRANCH | TOKYO BRANCH | TOKYO BRANCH | TOKYO BRANCH |
| 809 — O | — | ABC TRADING CO LTD. | ABC TRADING CO LTD. | ABC TRADING CO LTD. | ABC TRADING CO LTD. |
| 810 — C | — | JP | JP | JP | JP |
| 811 — COLOR | TRUE | FALSE | FALSE | FALSE | FALSE |
| 812 — STAPLE | FALSE | TRUE | FALSE | TRUE | |
| 813 — DOUBLE-SIDED | FALSE | FALSE | TRUE | FALSE | |
| 814 — IP ADDRESS | 192.1.2.1 | 192.1.2.10 | 192.1.2.100 | 192.1.2.101 | 192.1.2.200 |

FIG. 10

| | | 900 |
|---|---|---|
| 901 | LOCATION INFORMATION TAG | |
| 902 | NM | LBP1110 |
| 903 | MAP | 10X+10Y |
| 904 | DV | PRINTER |
| 905 | BL | 2-1 |
| 906 | FL | 2F |
| 907 | BU | AA BUILDING |
| 908 | OP | EXTEND |
| 909 | BR | TOKYO BRANCH |
| 910 | O | ABC TRADING CO LTD. |
| 911 | C | JP |
| 912 | DEVICE ATTRIBUTE INFORMATION TAG | |
| 913 | COLOR | TRUE |
| 914 | STAPLE | FALSE |
| 915 | DOUBLE-SIDED | FALSE |
| 916 | IP ADDRESS | 192.1.2.1 |

FIG. 14

| | | |
|---|---|---|
| NM | LBP1110 | 1301 |
| MAP | 10X+10Y | 1302 |
| DV | PRINTER | 1303 |
| BL | 2-1 | 1304 |
| FL | 2F | 1305 |
| BU | AA BUILDING | 1306 |
| OP | EXTEND | 1307 |
| BR | TOKYO BRANCH | 1308 |
| O | ABC TRADING CO LTD. | 1309 |
| C | JP | 1310 |
| COLOR | TRUE | 1311 |
| STAPLE | FALSE | 1312 |
| DOUBLE-SIDED | FALSE | 1313 |
| IP ADDRESS | 192.1.2.1 | 1314 |

C=JP, O=ABC TRADING CO LTD.,
BR=TOKYO BRANCH, OP=EXTEND,
BU=AA BUILDING

1401

| BL | BITMAP |
|---|---|
| 1-1 | FIG. 16 |
| 1-2 | FIG. 17 |
| 2-1 | FIG. 18 |
| 2-2 | FIG. 19 |
| ETC | FIG. 20 |

1402  1403

FIG. 21
| NM | BITMAP |
|---|---|
| MFP6550 | 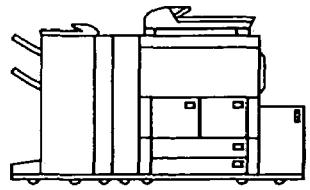 |
| LBP1110 | 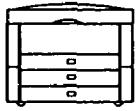 |
| LBP3310 | 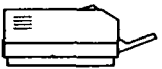 |
| SCN2160 | 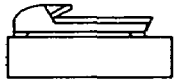 |
| PC5330 |  |
| NOTE5133 |  |
| GY33115 | 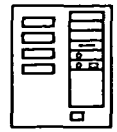 |
| PC6450 |  |
| UNKOWN | 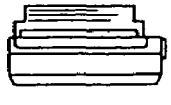 |

FIG. 36

| | | | | | |
|---|---|---|---|---|---|
| 801 — NM | LBP1110 | MFP6550 | LBP3310 | LBP3310 | SCN2160 |
| 802 — MAP | 10X+10Y | 5X+30Y | 10X+10Y | 15X+25Y | 5X+5Y |
| 803 — DV | PRINTER | MFP | PRINTER | PRINTER | SCANNER |
| 804 — BL | 2-1 | 2-1 | 2-2 | 1-1 | 1-2 |
| 805 — FL | 2F | 2F | 2F | 1F | 1F |
| 806 — BU | AA BUILDING | AA BUILDING | AA BUILDING | AA BUILDING | AA BUILDING |
| 807 — OP | EXTEND | EXTEND | EXTEND | EXTEND | EXTEND |
| 808 — BR | TOKYO BRANCH | TOKYO BRANCH | TOKYO BRANCH | TOKYO BRANCH | TOKYO BRANCH |
| 809 — O | ABC TRADING CO LTD. | ABC TRADING CO LTD. | ABC TRADING CO LTD. | ABC TRADING CO LTD. | ABC TRADING CO LTD. |
| 810 — C | JP | JP | JP | JP | JP |
| 811 — COLOR | TRUE | FALSE | FALSE | FALSE | FALSE |
| 812 — STAPLE | FALSE | TRUE | FALSE | TRUE | |
| 813 — DOUBLE-SIDED | FALSE | FALSE | TRUE | FALSE | |
| 814 — IP ADDRESS | 192.1.2.1 | 192.1.2.10 | 192.1.2.100 | 192.1.2.101 | 192.1.2.200 |

| C | JP | JP | JP | JP | JP |
|---|---|---|---|---|---|
| O | ABC TRADING CO LTD. | ABC TRADING CO LTD. | ABC TRADING CO LTD. | ABC TRADING CO LTD. | ABC TRADING CO LTD. |
| BR | | TOKYO BRANCH | TOKYO BRANCH | TOKYO BRANCH | TOKYO BRANCH |
| OP | | EXTEND | EXTEND | EXTEND | EXTEND |
| BU | | | AA BUILDING | AA BUILDING | AA BUILDING |
| FL | | | | 2F | 1F |
| BL | | | | | |
| MAP | | | | | |
| CORRESPOND-ING MAP | FIG. 33 | FIG. 35 | FIG. 37 | FIG. 39 | FIG. 41 |

| C | JP | JP | JP | JP | |
|---|---|---|---|---|---|
| O | ABC TRADING CO LTD. | ABC TRADING CO LTD. | ABC TRADING CO LTD. | ABC TRADING CO LTD. | — |
| BR | TOKYO BRANCH | TOKYO BRANCH | TOKYO BRANCH | TOKYO BRANCH | — |
| OP | EXTEND | EXTEND | EXTEND | EXTEND | — |
| BU | AA BUILDING | AA BUILDING | AA BUILDING | AA BUILDING | — |
| FL | 1F | 1F | 2F | 2F | |
| BL | 1-1 | 1-2 | 2-1 | 2-2 | |
| MAP | | | | | |
| CORRESPONDING MAP | FIG. 16 | FIG. 17 | FIG. 18 | FIG. 19 | FIG. 20 |

| REGISTRATION REQUEST TAG | 3602 |
|---|---|
| NM | LBP1110 |
| MAP | 30X+20Y |
| DV | PRINTER |
| BL | 2-1 |
| FL | 2F |
| BU | AA BUILDING |
| OP | EXTEND |
| BR | TOKYO BRANCH |
| O | ABC TRADING CO LTD. |
| C | JP |

SYSTEM FOR SETTING LOCATION INFORMATION IN A DEVICE ON A NETWORK

BACKGROUND OF THE INVENTION

1. Field of the Invention

The present invention relates to a system for searching a device on a network, and more particularly to a device searching system which can plainly display a searched device and its location information.

2. Related Background Art

Directory service has been provided as a method of efficiently searching and utilizing various resources (such as printers, servers and scanners) connected to a network.

Such directory service is, so to speak, a telephone directory of a network which stores various information. A specific example of a directory system using the directory service is LDAP (Lightweight Directory Access Protocol). The specifications of LDAP are described in RFC (Request For Comments) 1777 which is standard specifications issued by IETF (Internet Engineering Task Force).

For example, by searching device terminals connected to a network by using the directory service, a list of device terminals usable by the network can be obtained.

However, this list does not provide location information of a device terminal in a way easy to recognize.

A device search system has been desired which is suitable for notifying a user of device hierarchical location information in a way easy to confirm. For example, if the device is a network printer, the device hierarchical location information may be "location of a printer nearest to the user on this floor", "location of a color printer in a building" and the like.

SUMMARY OF THE INVENTION

Under the above-described circumstance, it is an object of the invention to provide a device search system which supplies a user with hierarchical location information of devices in a way easy to recognize and which is easy to be configured and maintained.

According to an embodiment of the invention, in a network system having a server, a client and a plurality of devices, the server manages a directory database registering a plurality set of attribute information corresponding to devices on the network, and in response to a search request from the client, searches a device from the directory database, and transmits a search result to the client.

The database registers, as the attribute information, hierarchical location information representing a location of each device on the network in a hierarchical data structure, and the search result includes the hierarchical location information of the searched device.

The client changes the hierarchical location information of the searched device, and transmits the changed hierarchical location information to the corresponding device;

the device stores the changed attribute information received from the client in a memory and transmits the stored, changed hierarchical location information to the server; and the server updates the registration contents of the database in response to a reception of the changed attribute information from the device.

Other objects and features of the present invention will become more apparent from the following description of embodiments when read in conjunction with the accompanying drawings.

BRIEF DESCRIPTION OF THE DRAWINGS

FIG. 9 is a diagram showing hierarchical location information and attribute information managed by a server computer.

FIG. 10 is a diagram showing hierarchical location information and attribute information registered by a device.

FIG. 14 is a diagram showing an example of device search results.

FIG. 15 is a diagram showing a bit map and hierarchical location information managed by a client computer.

FIG. 21 is a diagram showing device bit maps managed by the client computer.

FIG. 36 is a diagram showing a database of hierarchical location information and attribute information managed by a server.

FIG. 37 is a diagram showing an example of a map list corresponding to each hierarchical level to be searched, according to a fourth embodiment of the invention.

DETAILED DESCRIPTION OF THE PREFERRED EMBODIMENTS

With reference to the accompanying drawings, embodiments of the invention will be described.

Figure 1:
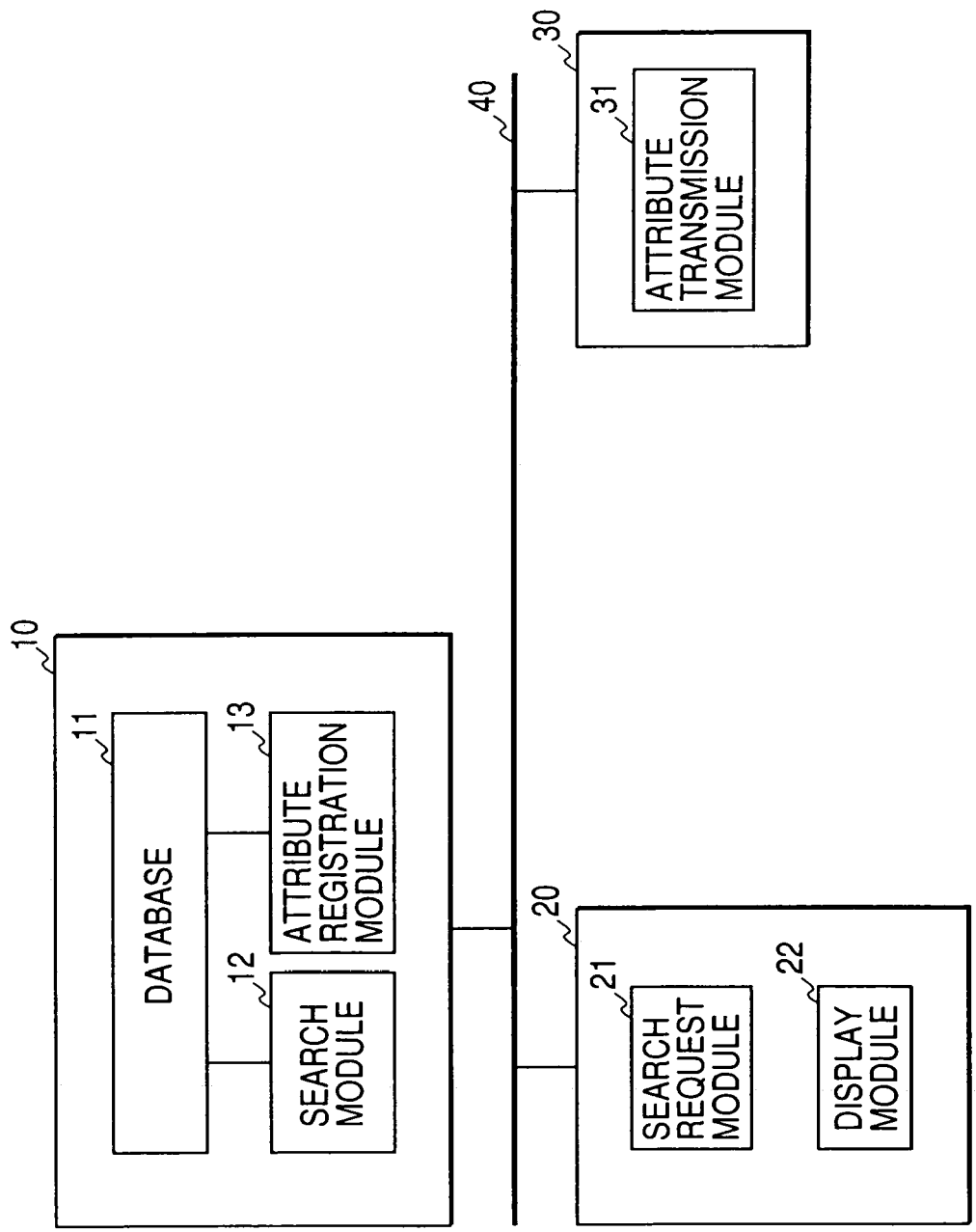
FIG. 1 is a diagram showing the configuration of a network system according to the invention.

FIG. 1 is a diagram showing the structure of a device search system according to the invention.

As shown in FIG. 1, a client computer 20, a device 30 and a server computer 10 are connected to a network 40.

The client 20 may be a general computer or the like. The client 20 comprises a search module 21 and a display module 22. The search module 21 transmits a desired device search condition to the server 10 and receives the search result. The display module 22 displays the received search result.

The server 10 has a database 11 for managing attribute information of devices on the network 40 and functions as a directory server. Identification information and various attribute information of each device on the network are stored in the database 11.

In accordance with a device search condition received from the client 20, the search module 12 searches a device satisfying the condition from the database 11 and transmits the search result to the client. A device attribute registration module 13 receives the device attribute from the device 30 and registers it in the database 11.

The device 30 has a function of providing the client 20 with various services, and may be a scanner, a printer, a facsimile or the like. A device attribute transmission module 31 transmits its attribute information to the server 10 and requests the server 10 to register it.

An example shown in FIG. 1 provides the minimum unit of the structure of the device search system. In practice, a plurality of clients and devices are connected to the network.

The device search system may have a plurality of servers.

Figure 2:
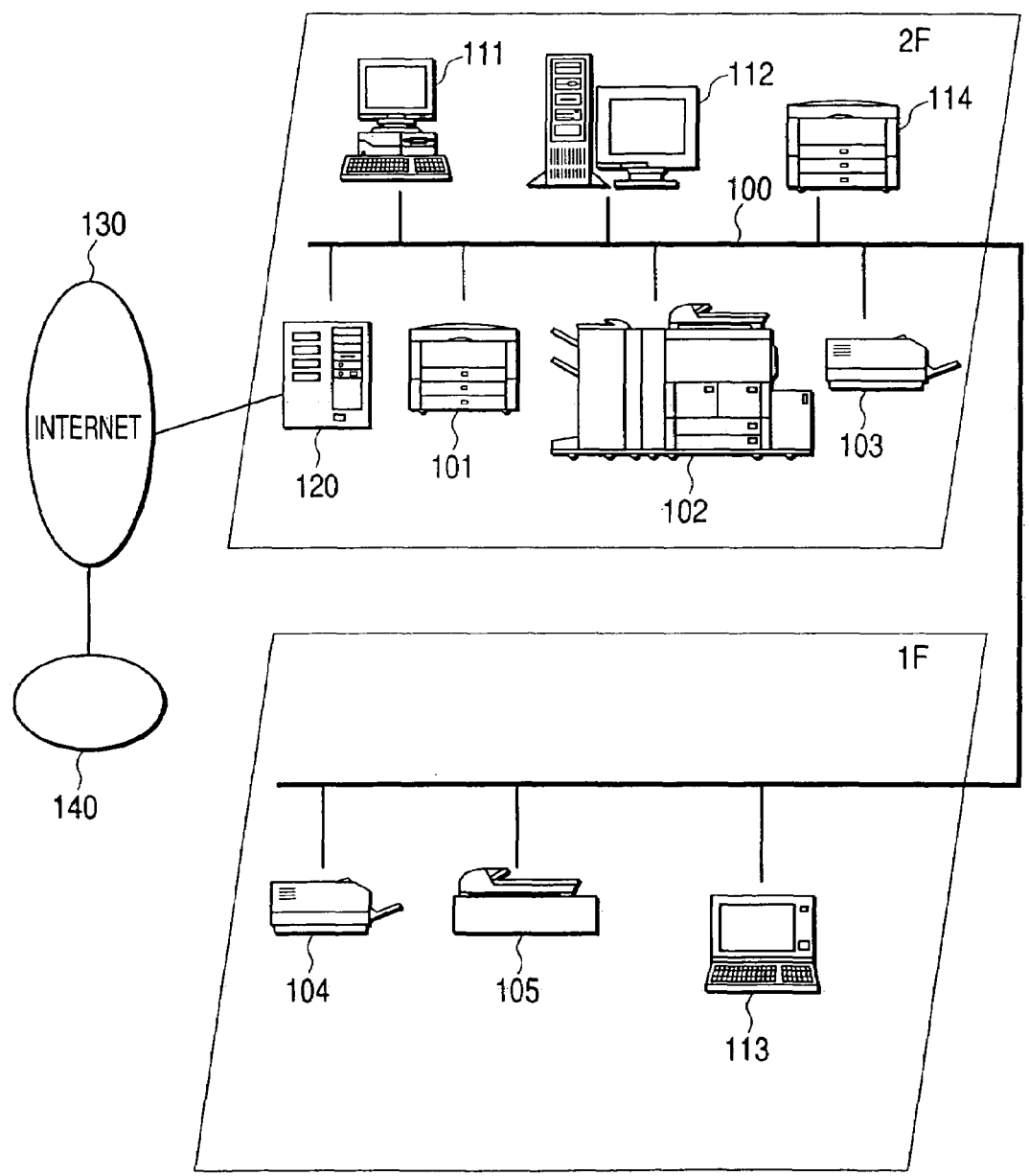
FIG. 2 is a diagram showing the structure of a network on which a device search system of an embodiment runs.

FIG. 2 is a diagram showing the specific structure of a network on which the device search system of the embodiment runs.

In FIG. 2, reference numeral 101 represents a color printer, reference numeral 102 represents an MFP (Multi Function Peripheral) which is a copier capable of being used also as a network printer, reference numerals 103 and 104 represent a monochrome printer, and reference numeral 105 represents a scanner. These are all connected to the network.

Reference numerals 111 and 113 represent a desk top PC and a note PC. These PCs can execute programs of network clients. The desk top PC 111 and note PC 113 are connected to the network as clients, and have the functions of issuing inquiry information on a device satisfying a desired condition to the server connected to the network and displaying the search result, as will be later described.

Reference numeral 112 represents a PC capable of executing a program of the network server of the embodiment. This PC 112 stores various information on the network devices 101 and 105 as will be later described, and receives a device search inquiry from the client 111 or 113 connected to the network to return the search result.

Of these devices, the color printer 101, MFP copier 102, monochrome printer 103, client 111, server 112 and a fire wall 120 are installed on the second floor 2F, whereas the monochrome printer 104 and scanner 105 are installed on the first floor 1F. The note PC 113 installed on the first floor and connected to a LAN 100 may be removably used.

The network 100 interconnecting these devices is connected via the fire wall 120 to the Internet 130 and to another network 140. Reference numeral 114 represents a device whose location is not known. In this embodiment, one color printer is shown as the device whose location information is not known.

Figure 3:
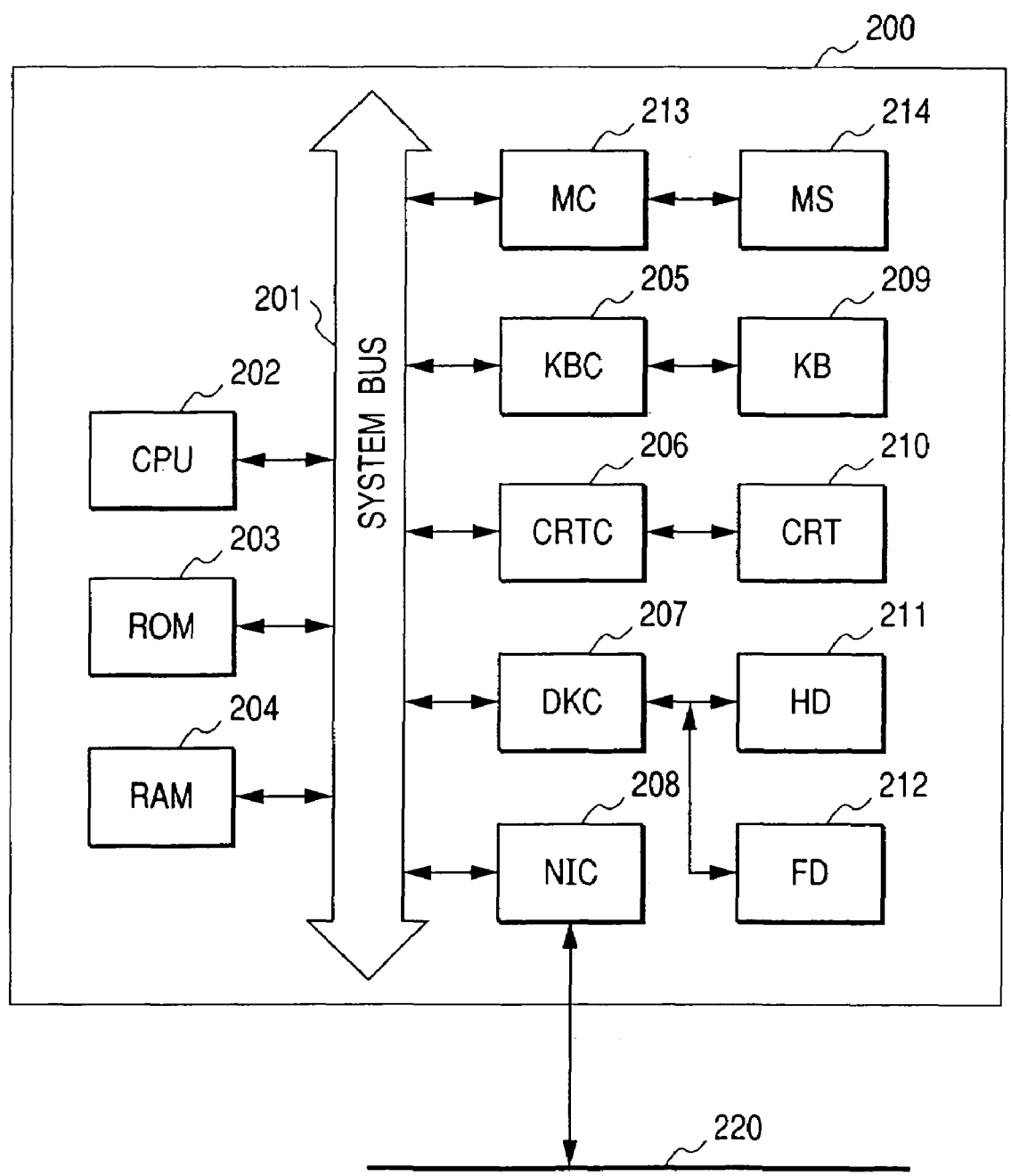
FIG. 3 is a diagram showing the internal structure of a general personal computer.

FIG. 3 is a schematic diagram showing the internal structure of a general personal computer. The fundamental internal structure of the desk top PC 111, note PC 113, server 112 or the like shown in FIG. 2 is the same as that shown in FIG. 3. In FIG. 3, reference numeral 200 represents a PC which executes client software and work server software (collectively called network device search software) and corresponds to the client 111, server 112 and note PC 113 shown in FIG. 2.

PC 200 has a CPU 202 which executes the network device search software stored in a hard disk (HD) 211 or a floppy disk (FD) 212. PC 200 collectively controls each device connected to a system bus 201.

Reference numeral 204 represents a RAM which functions as a main memory, work memory or the like of CPU 202. Reference numeral 205 represents a keyboard controller (KBC) which controls inputs from a keyboard (KB) 209, an unrepresented pointing device and the like. Reference numeral 206 represents a CRT controller (CRTC) which controls a CRT display (CRT) 210.

Reference numeral 207 represents a disk controller (DKC) which controls access to the hard disk (HD) 211 and floppy disk (FD) 212 storing a boot program, various application programs, edition files, user files, network management programs and the like.

Reference numeral 208 represents a network interface card (NIC) which transfers data to and from the network printer, another network device or another PC via LAN 220.

Reference numeral 213 represents a mouse controller (MC) which controls a mouse (MS) 214. In this embodiment, LAN 220 corresponds to LAN 100 shown in FIG. 2.

Next, hierarchical location information representative of a location of each device on the network will be described.

Figure 4:
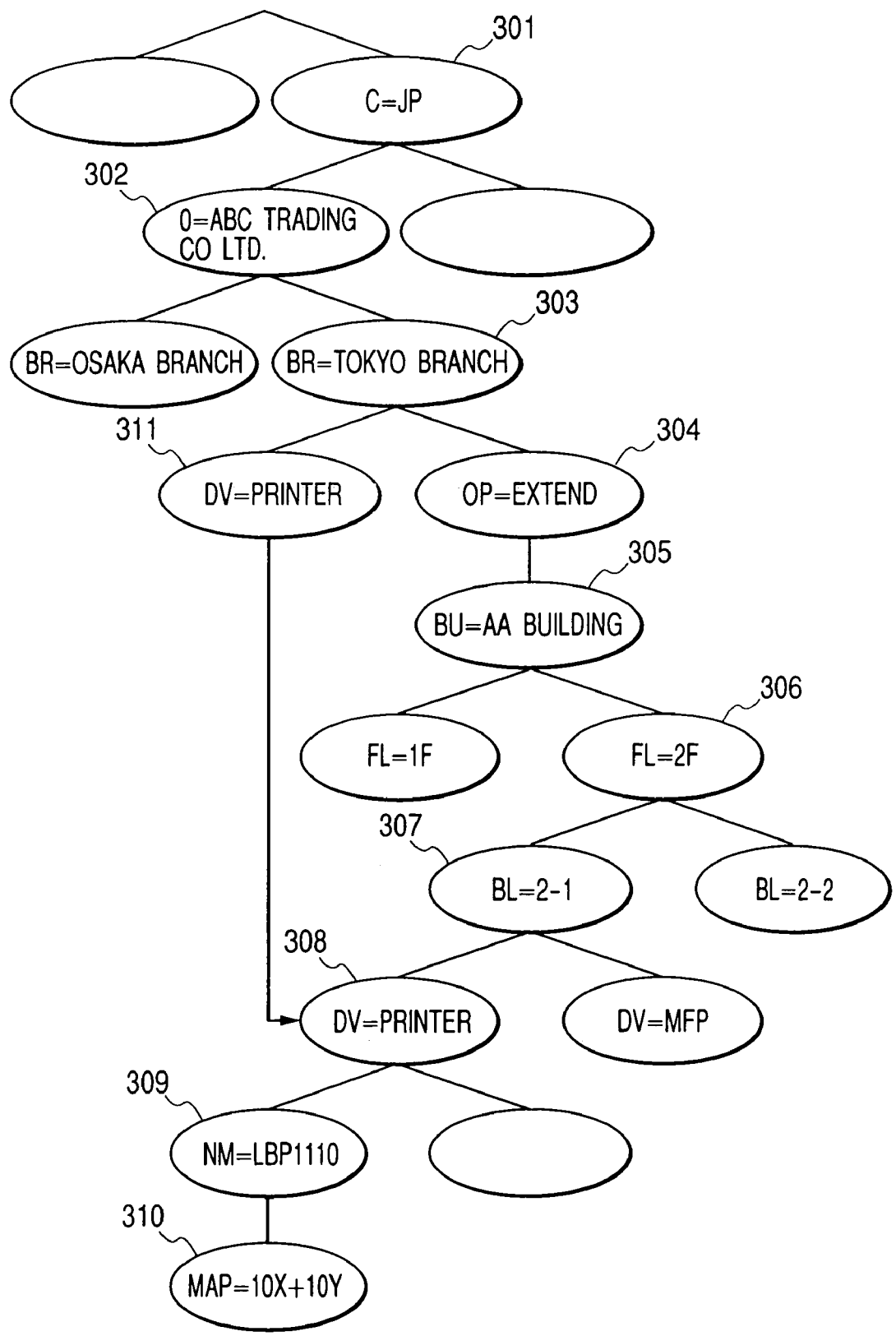
FIG. 4 is a diagram showing an example of hierarchical location information.

As shown in FIG. 4, the data structure of hierarchical location information is hierarchical so that detailed location information can be identified from the upper hierarchical layer to lower hierarchical layer. A user designates a desired hierarchical level in accordance with a use object.

In the example shown in FIG. 4, the hierarchical location information of LBP1100 indicated by reference numeral 309 is designated by (C=JP (301), O=ABC trading Co. Ltd. (302), BR=Tokyo branch (303), OP=extend (304), BU=AA building (305), FL=2F (306), BL=2-1 (307), DV=printer (308)). In this case, a map (310) is represented by "10X+ 10Y".

Each entry will be described. "C" indicates country information (JP is Japan, US is America, etc.). "O" indicates organization information (ABC trading Co. Ltd., XYZ trading Co. Ltd., etc.). "BR" indicates branch information such as a branch shop and a branch office (Tokyo branch, Osaka branch, etc., hereinafter called branch information).

"BU" indicates building information (AA building, BB building, etc.). "FL" indicates floor information (1F, 2F, etc.). "BL" indicates block information of a block on each floor (1-1, 2-1, etc.). "DV" indicates device information (printer, MFP, etc.). "NM" indicates a device name (LBP1110, LBP3310, etc.).

A layout bit map is prepared for a block hierarchical level "BL", the layout bit map including image data for visually displaying the layout. The coordinate information of the layout bit map is indicated by the map 310 shown in FIG. 4.

"OP" shown in FIG. 4 indicates option information representative of the extended information of "BU", "FL" and "BL" hierarchical levels.

The option information may be set to another hierarchical level or it may be omitted from the data structure.

As described earlier, the main object of the invention is to hierarchically manage location information of devices connected to a network, identify the location of the device requested to search in a hierarchical structure, and display the identified device location for the user in a way easy to recognize.

FIGS. 5 to 8 show examples of a layout bit map corresponding to each block hierarchical level of the hierarchical location information. This layout bit map is displayed at the client 111 to display the location of a device in a way easy to recognize.

Figure 5:
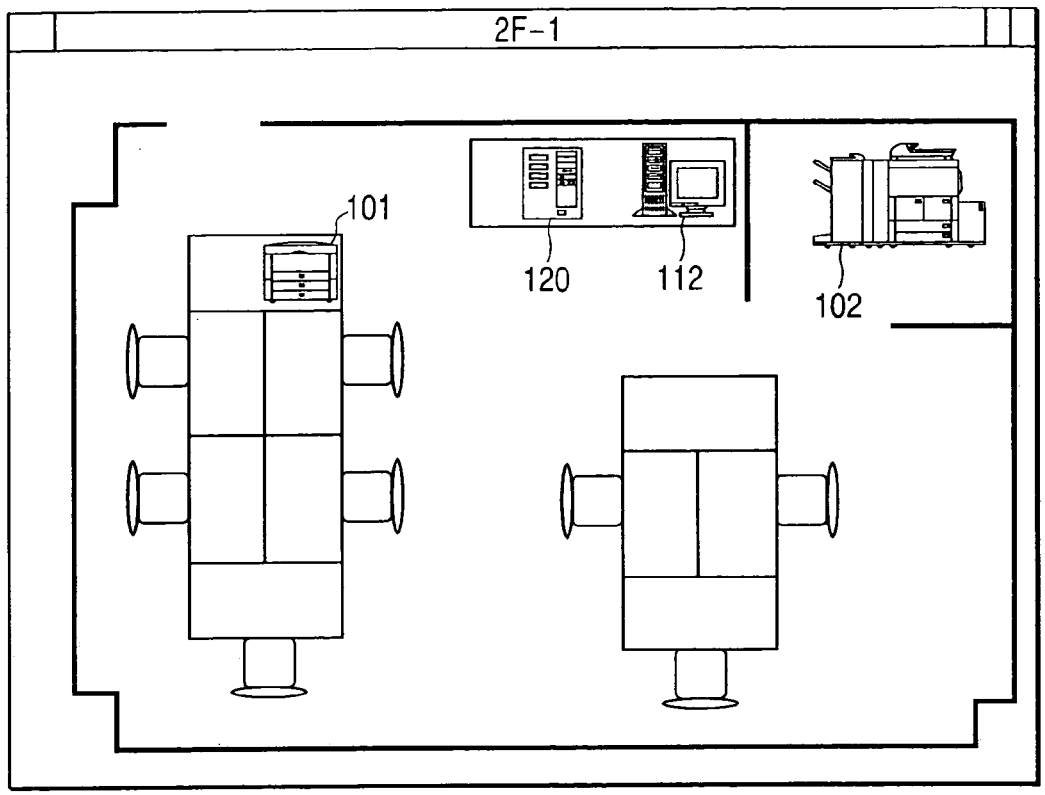
FIG. 5 is a diagram showing the location of each device in a block 2-1 at 2F.

FIG. 5 shows an example of a layout bit map corresponding to a block 2-1 on 2F. The layout of desks, partitions and the like on the floor is held as a bit map. On this layout, the color printer 101, MFP 102, fire wall 120 and server 112 are disposed as shown in FIG. 5.

Figure 6:
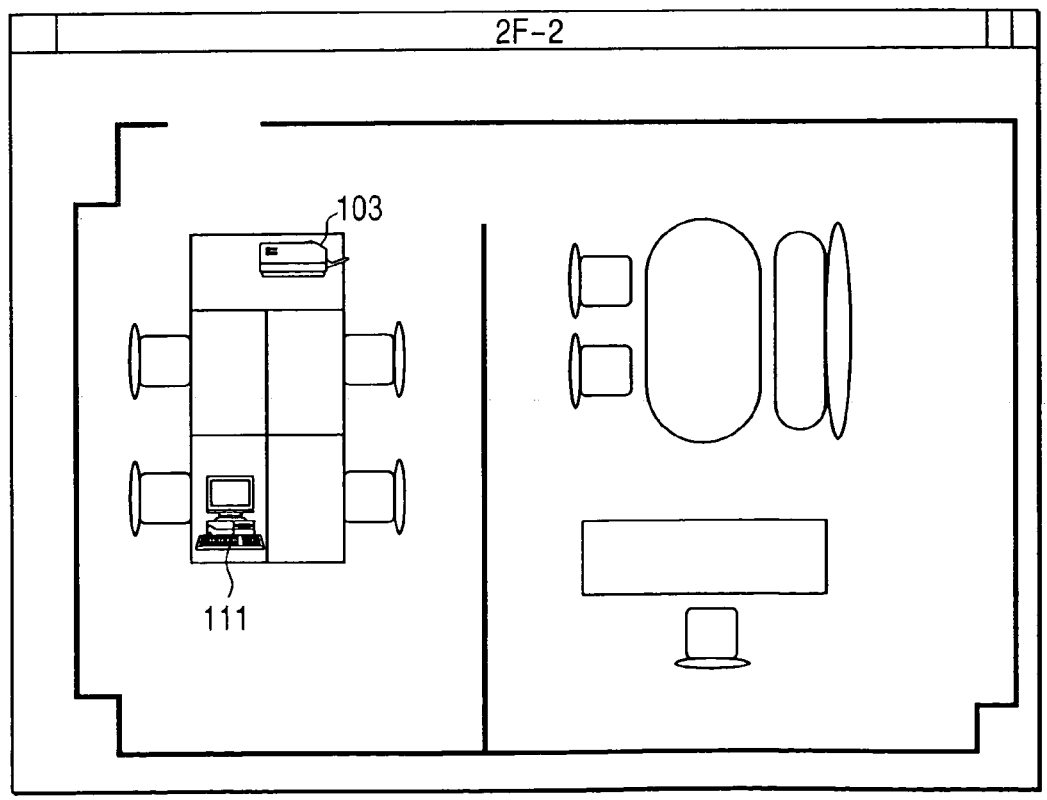
FIG. 6 is a diagram showing the location of each device in a block 2-2 at 2F.

FIG. 6 shows an example of a layout bit map corresponding to a block 2-2 on 2F. In the block 2-2 on 2F, PC 111 and printer 103 are disposed as shown in FIG. 6.

Figure 7:
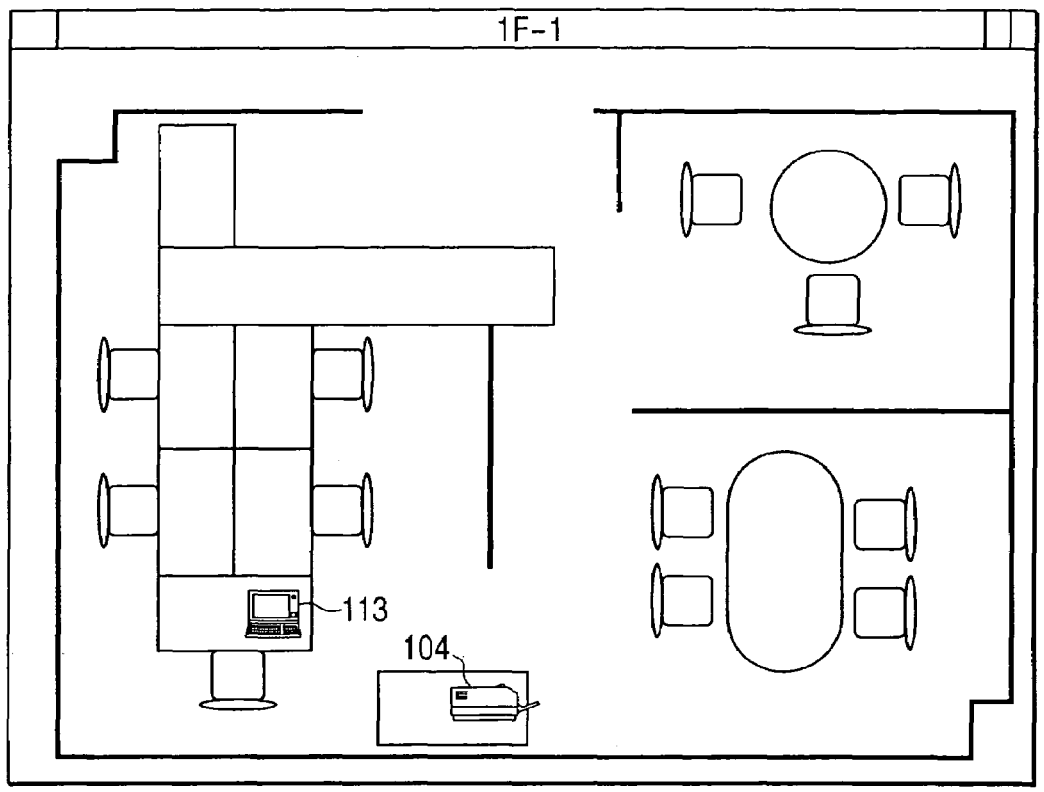
FIG. 7 is a diagram showing the location of each device in a block 1-1 at 1F.

FIG. 7 shows an example of a layout bit map corresponding to a block 1-1 on 1F. In the block 1-1 on 1F, PC 113 and monochrome printer 104 are disposed as shown in FIG. 7.

Figure 8:
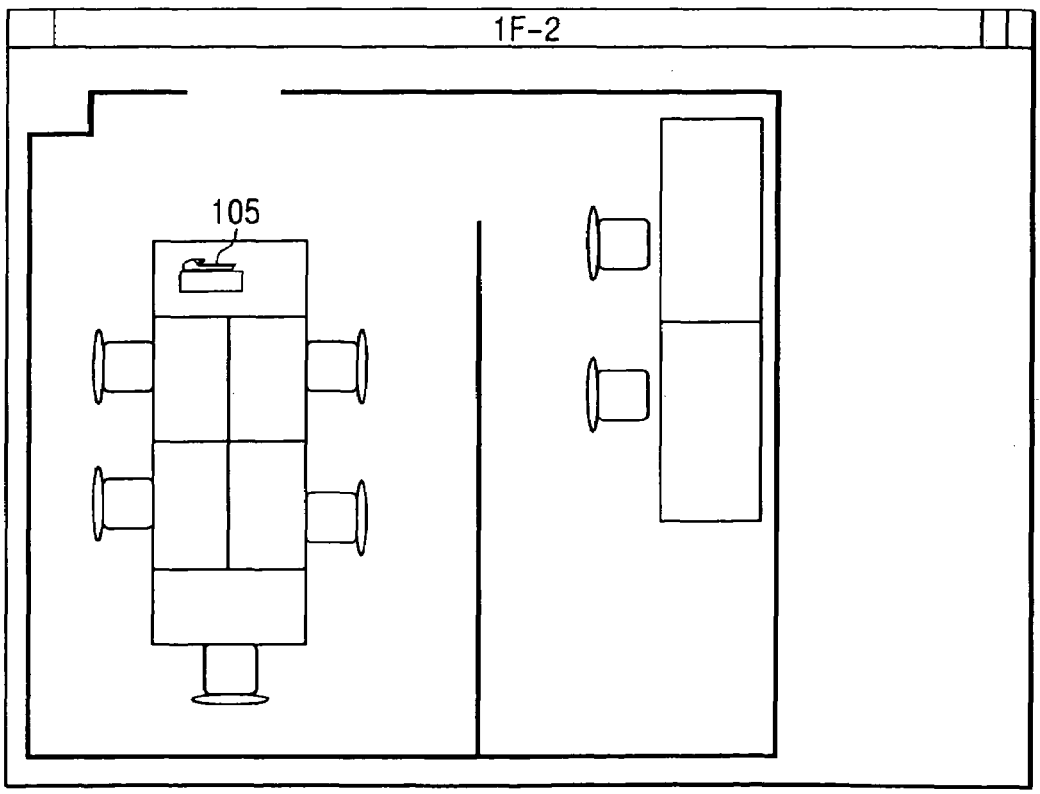
FIG. 8 is a diagram showing the location of each device in a block 1-2 at 1F.

FIG. 8 shows an example of a layout bit map corresponding to a block 1-2 on 1F. In the block 1-2 on 1F, the scanner 105 is disposed as shown in FIG. 8. This scanner is displayed at the client computer of a user as will be later described.

First to third embodiments of a device search system using the hierarchical location information will be described.

In the device search system of the first embodiment, when a new device is found on the network, the hierarchical location information of the new device is registered.

In the device search system of the second embodiment, when the location of a device on the network is changed, the hierarchical location information of the new device is changed.

In the first and second embodiments, the layout bit map for displaying the location of each searched device is held in the client 111, whereas in the third embodiment, the layout bit map of each device is held in the server 112.

In the first to third embodiments, only the layout bit maps at respective block (BL) hierarchical levels are stored, whereas in the fourth embodiment, the layout bit maps at respective hierarchical levels of the hierarchical location information are stored and reflected upon the search result display at the client 111.

First Embodiment

In the device search system of the first embodiment, when a new device is found on the network, the hierarchical location information of the new device is registered. In this system, the layout bit map for displaying the location of the searched device is held by the client 111.

The structure of the server 112 for managing attribute information of each device on the network will be described first.

FIG. 9 shows an example of the structure of a database of the server 112 for managing attribute information of each device on the network.

In FIG. 9, each column corresponds to a set of data registered for each device, i.e., a tuple. Each row corresponds to an attribute for each tuple.

In this database 800 shown in FIG. 9, hierarchical location information is stored at 802 to 810 and other attribute information is stored at 811 to 814, in correspondence to each device.

Examples of the other attribute information include an attribute 811 representative of a presence/absence of a color input/output function, an attribute 812 representative of a presence/absence of a staple function, an attribute 813 representative of a presence/absence of a double-sided print function, and an IP address 814.

In this example shown in FIG. 9, the hierarchical location information of the device "LBP1110") is not registered.

FIG. 10 shows an example of the structure of device registration data which is used when the device is registered in the database 800 managed by the server 112.

The device registration data 900 includes location information TAG 901 (902 to 911) set with the device hierarchical location information and device attribute information TAG 912 (913 to 916) set with the device attribute information. After a power is turned on, each device transmits its own device registration data 900 to the server 112.

The transmission operation of the device registration data 900 may be executed when any item in the device registration data 900 is changed, when a device is plugged in to the network, or periodically. The device registration data 900 may be transmitted from the device in response to an inquiry from the server.

Upon reception of the device registration data 900 from a device, the server registers the received device registration data in the database 800.

The example shown in FIG. 10 is the device registration data for the device "LBP1110". If the hierarchical location information is not still registered at the LBP1110 side, data is not set to 903, 905 to 911 or meaningless data is set and transmitted to the server 112.

Figure 11:
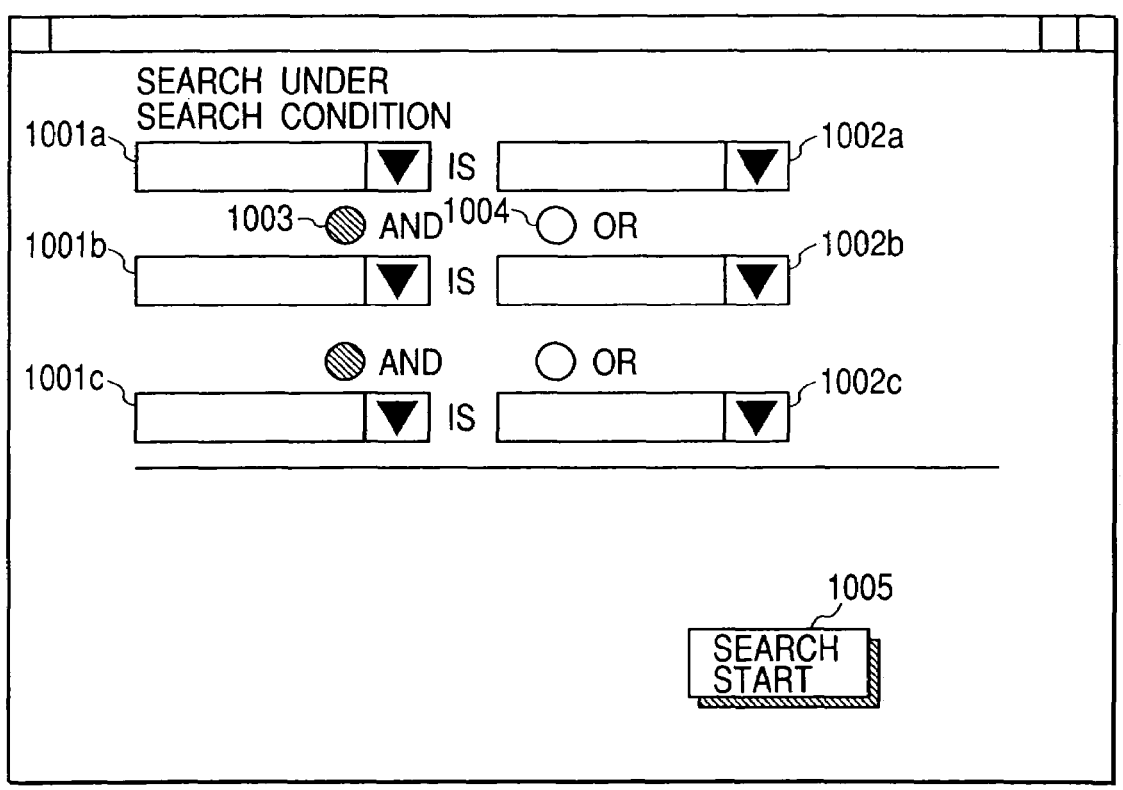
FIG. 11 is a diagram showing an example of a device search input window.

FIG. 11 shows a search condition input window to be used for search by the client PC 111. Search entries are input at 1001a to 1001c. In this input window, a pull-down menu can be used to select a desired search condition. Attribute information corresponding to each entry is input at 1002a to 1002c.

For example, if a device is selected as the entry, the pull-down menu of printer, MFP and scanner is displayed as the attribute and a user selects one of them as the search attribute information.

The search condition is entered by using input buttons 1003 and 1004, the input button 1003 entering the search condition AND and the input button 1004 entering the search condition OR. After the user enters the search conditions, a search starts when a search start button 1005 is actuated.

Figures 12, 13:
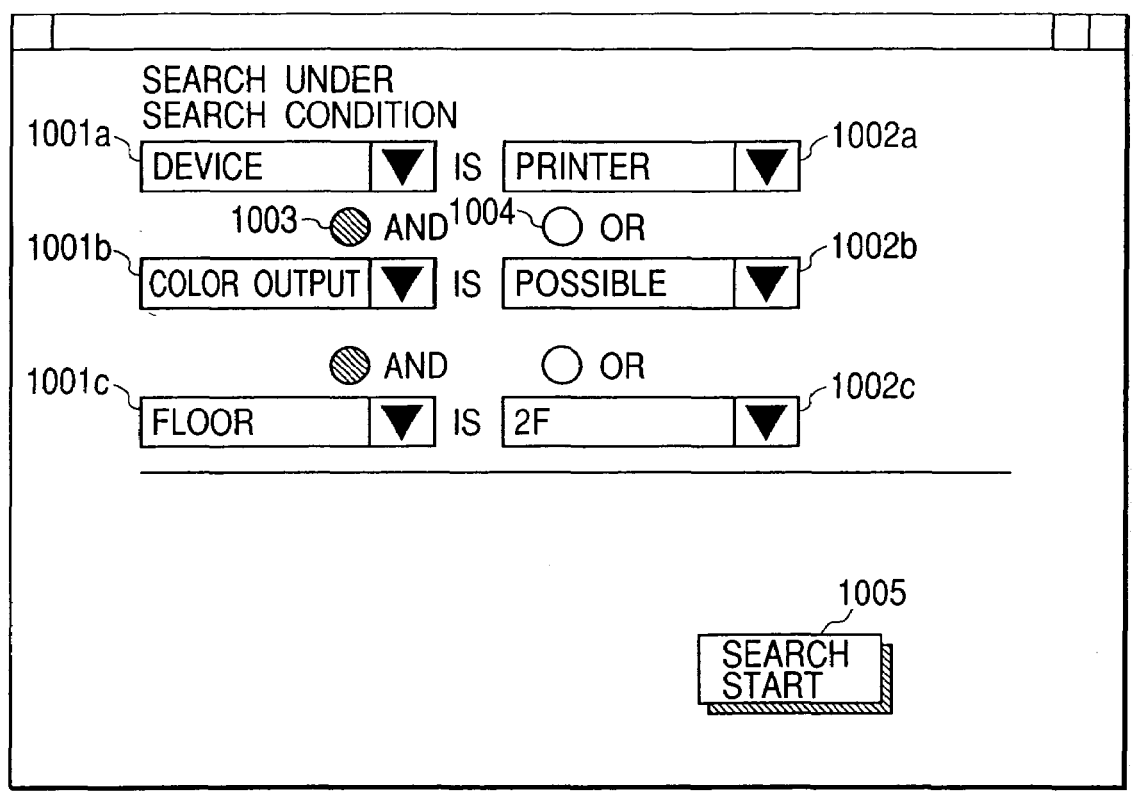
FIG. 12 is a diagram showing a specific example of a device search input window.
FIG. 13 is a diagram showing an example of device search conditions.
Figure 16:
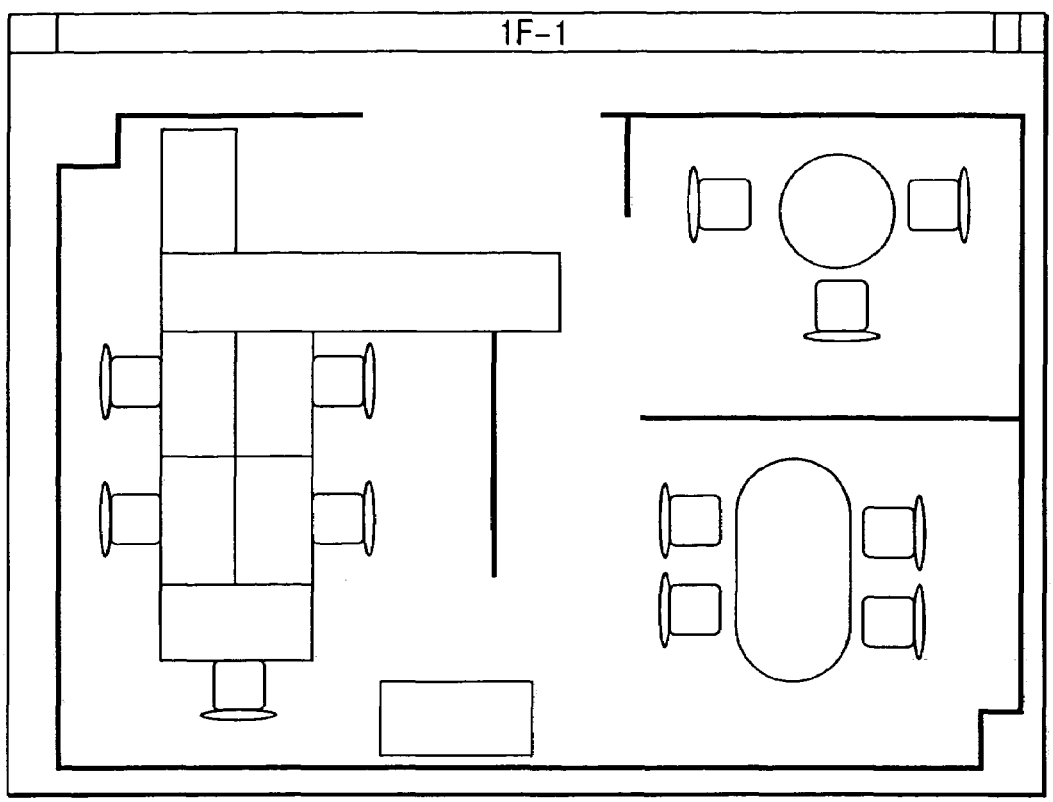
FIG. 16 is a diagram showing a layout bit map managed by the client computer.
Figure 17:
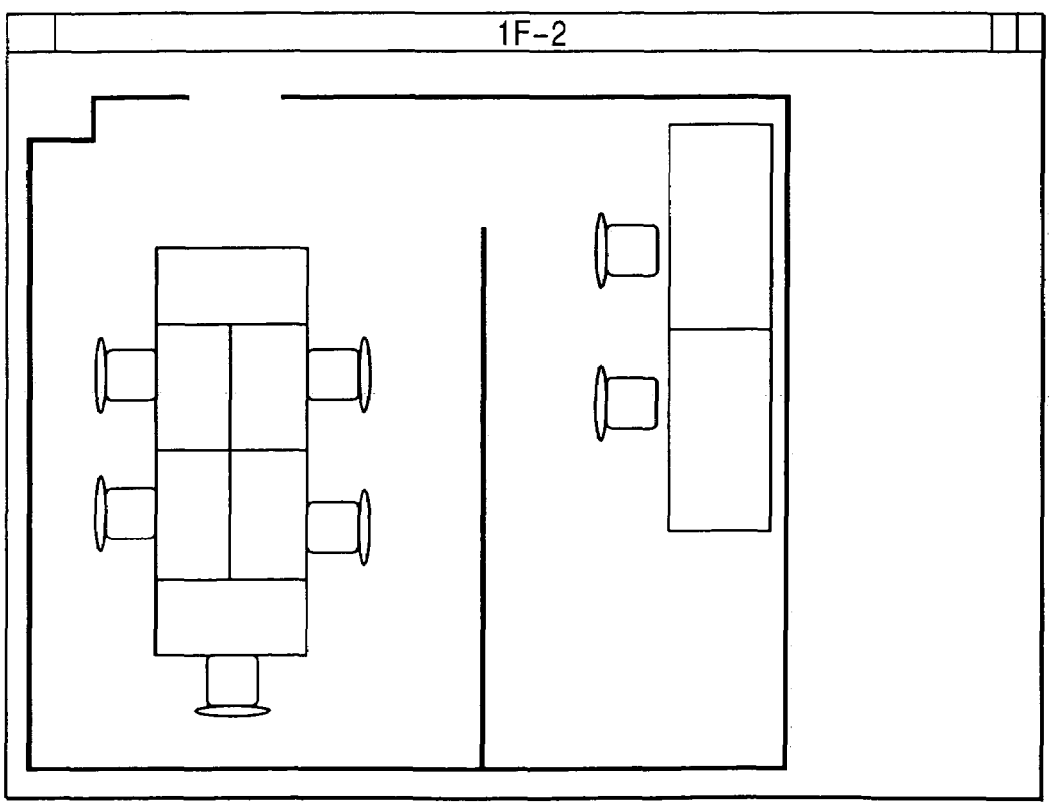
FIG. 17 is a diagram showing a layout bit map managed by the client computer.

FIG. 12 is a diagram showing an example of a search input. In this example, the attribute information is a printer with a color print function. If a printer at 2F is to be searched, a "floor" is entered at 1001c and "2F" is entered at 1002c.

If the detailed location of 2F is to be designated for the search, for example a "block" is entered at 1001c and "2-1" is entered at 1002c. A search for "printer at block 2-1" can therefore be executed.

FIG. 13 is a diagram showing an equation of the search conditions described above. In this example, the floor (FL) is the second floor (2F), the device (DV) is the printer (printer), and the color output (color) is possible (TRUE).

It is necessary to describe how the server received the search condition equation shown in FIG. 13 evaluates the equation "FL=2F". The reason is as follows. The location condition of floor=2F is satisfied not only by the device installed on 2F of the AA building of the Tokyo branch desired by the user to be searched, but also by the device installed on 2F of the YY building of the Osaka branch. Therefore, the device of the YY building of the Osaka branch not desired by the user is also searched and the search result unnecessary for the user is given.

In order to avoid this, it is necessary that the server 112 has a scheme of automatically identify the upper hierarchical level than the floor hierarchical level (FL).

One example of this scheme is to make the server store hierarchical location information for the search conditions at the hierarchical level higher than the floor hierarchical level (FL) and use this information. According to this method, when a search request is issued to the server installed at the AA building of the Tokyo branch under the condition of "FL=2F", only the device on 2F of the AA building can be used as the search candidate.

If the device installed on 2F of the YY building of the Osaka branch is desired to be searched, a search request is issued to the server installed on 2F of the YY building of the Osaka branch under the search condition of "FL=2F".

In the example shown in FIG. 12, although a specific hierarchical level is designated, a so-called full-path designation from the highest hierarchical level (C) to a predetermined hierarchical level may also be used.

In this case, the search condition equation shown in FIG. 13 is a full-path designation from the highest hierarchical level (e.g., C=JP, O=ABC, BR=Tokyo branch, . . . ).

With this full-path designation, it is possible to search the device installed on 2F of the YY building of the Osaka branch from the server installed at the AA building of the Tokyo branch.

FIG. 14 shows an example of the search result of the device satisfying the search condition shown in FIG. 13, returned from the server 112 to the client PC 111.

In accordance with the search condition shown in FIG. 13 and received from the client 111, the server 112 searches the database 800 (FIG. 9) and the satisfied device information is returned to the client 111 as the search result 1300.

The search result 1300 includes the hierarchical location information 1301 to 1310 and device attribute information 1311 to 1314. If there are a plurality of devices satisfying the search condition, the search result 1300 includes the hierarchical location information 1301 to 1310 and device attribute information 1311 to 1314, respectively of a plurality of devices.

Since the device satisfying the search condition shown in FIG. 13 is only LBP1110, only the information shown in FIG. 14 is returned to the client 111.

FIG. 15 is a correspondence list between block hierarchical levels of the hierarchical location information and layout bit maps, stored in the client 111.

By using this correspondence list, the client 111 can identify the layout bit map in accordance with the hierarchical location information.

In this embodiment, layout bit maps shown in FIGS. 16 to 19 are stored in correspondence with the blocks 1-1, 1-2, 2-1 and 2-2.

Figure 20:
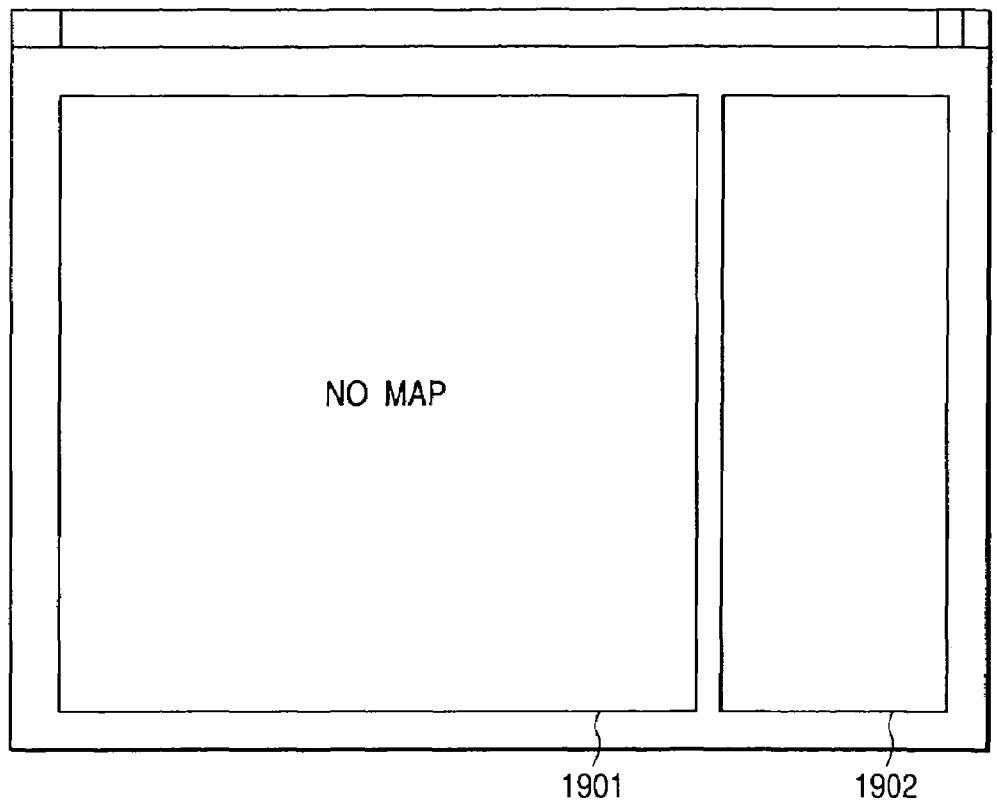
FIG. 20 is a diagram showing a layout bit map managed by the client computer.

For other blocks, the layout bit map shown in FIG. 20 is displayed.

FIGS. 16 to 19 show the layout bit maps at block hierarchical levels. In this embodiment, information representative of the searched device is displayed superposing upon the layout bit map. It is therefore possible to visually confirm the location, block and floor of the search requested device.

FIG. 20 shows the layout bit map (hereinafter called an unknown map) which is displayed when the layout bit maps of the client cannot be used. In FIG. 20, in an area 1901 an indication that there is no layout bit map is displayed, and in an area 1902 a device not having the hierarchical location information or not coincident with the hierarchical location information is displayed.

FIG. 21 shows device icons for displaying devices of the client 111.

Each device icon is one-to-one correspondence with each device name (NM), and an unknown device icon representative of a device whose name is not known is displayed.

Figure 22:
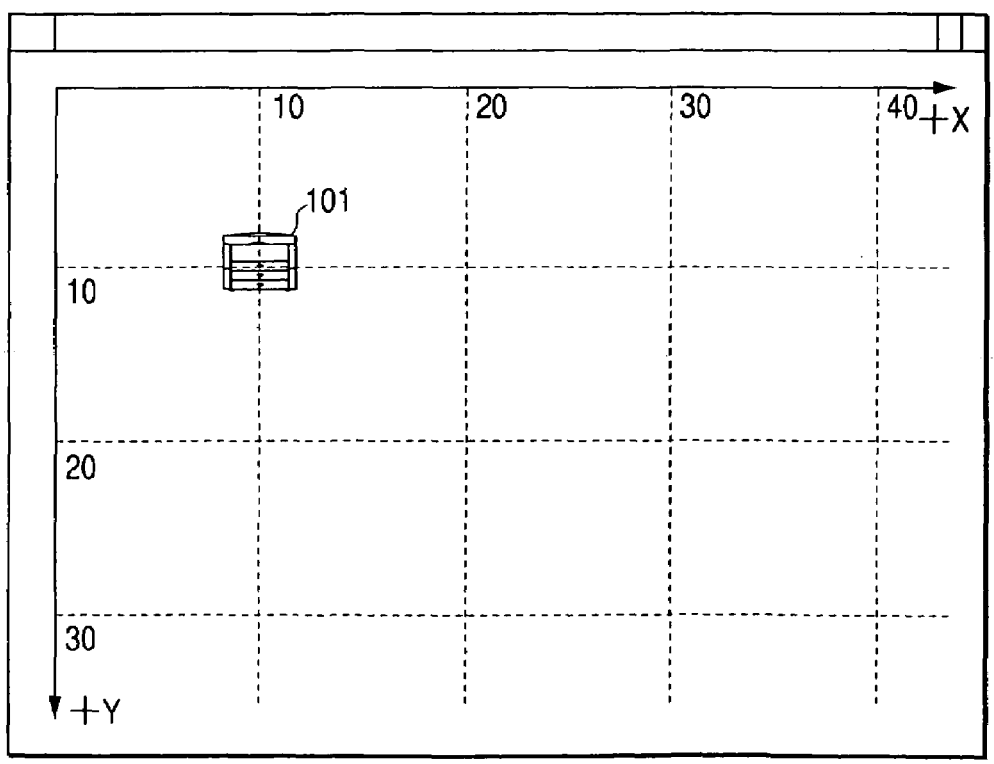
FIG. 22 is a diagram showing the location of a device bit map.

FIG. 22 is a diagram illustrating a scheme of displaying a device icon on the layout bit map, to be executed by the client 111.

The client derives the hierarchical location information and device attribute information from the search result acquired from the server 112, and selects the corresponding layout bit map and device icon.

Since the coordinate information for the selected layout bit map can be obtained from the acquired hierarchical location information, the device icon 2002 representative of the color printer 101 (LBP1110) is superposed at the coordinate "10X+10Y" of the selected layout bit map.

By superposing the device icon at the corresponding coordinate of the layout bit map, it is possible to display the location of the search requested device in a manner easy to be recognized by the user.

Figure 23:
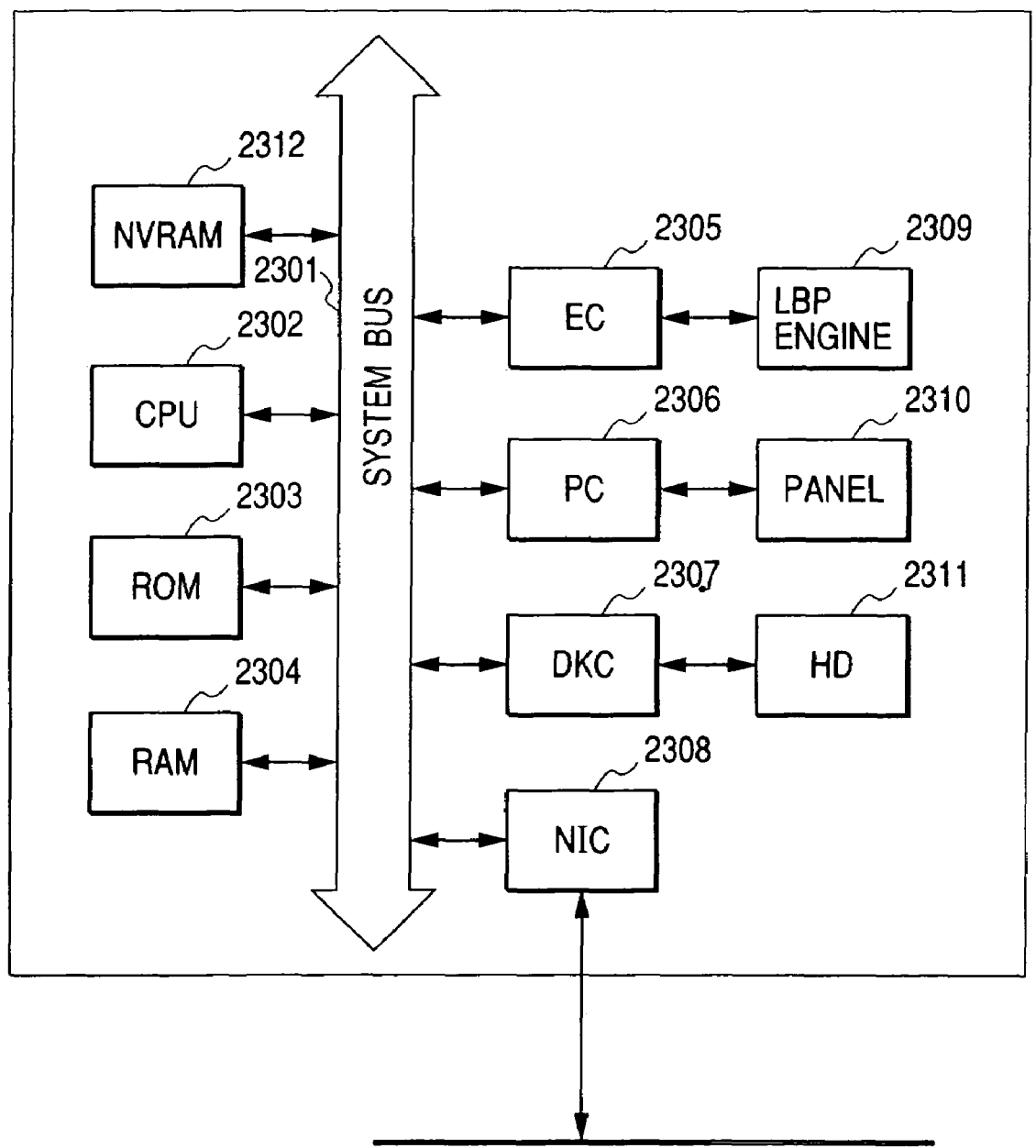
FIG. 23 is a diagram showing the internal structure of a device.

FIG. 23 is a block diagram showing the internal structure of the color LBP 101 of this embodiment. As shown in FIG. 23, connected to a system bus 2301 of this printer 101 are a CPU 2302 for executing a program, a ROM 2303 for storing programs, and a RAM 2304 used as a work area and a buffer area for programs.

Reference numeral 2305 represents an LBP engine controller to which an engine 2309 is connected. Reference numeral 2306 represents a panel controller which manages a panel 2310 by controlling input/output to and from the panel.

The color LBP1110 of this embodiment has a hard disk (HD) 2211 and can temporarily spool print data in this disk. Reference numeral 2307 represents a disk controller which controls HD 2211. Reference numeral 2308 represents a network interface controller to which a network is connected.

Reference numeral 2312 represents a non-volatile RAM (NVRAM) which retains data even while the power of the printer 101 is turned off. In this embodiment, NVRAM stores hierarchical location information, attribute information, and the like.

FIGS. 24 to 28 are flow charts illustrating the operation of the embodiment. The details of this embodiment will be given with reference to the flow charts.

Figure 28:
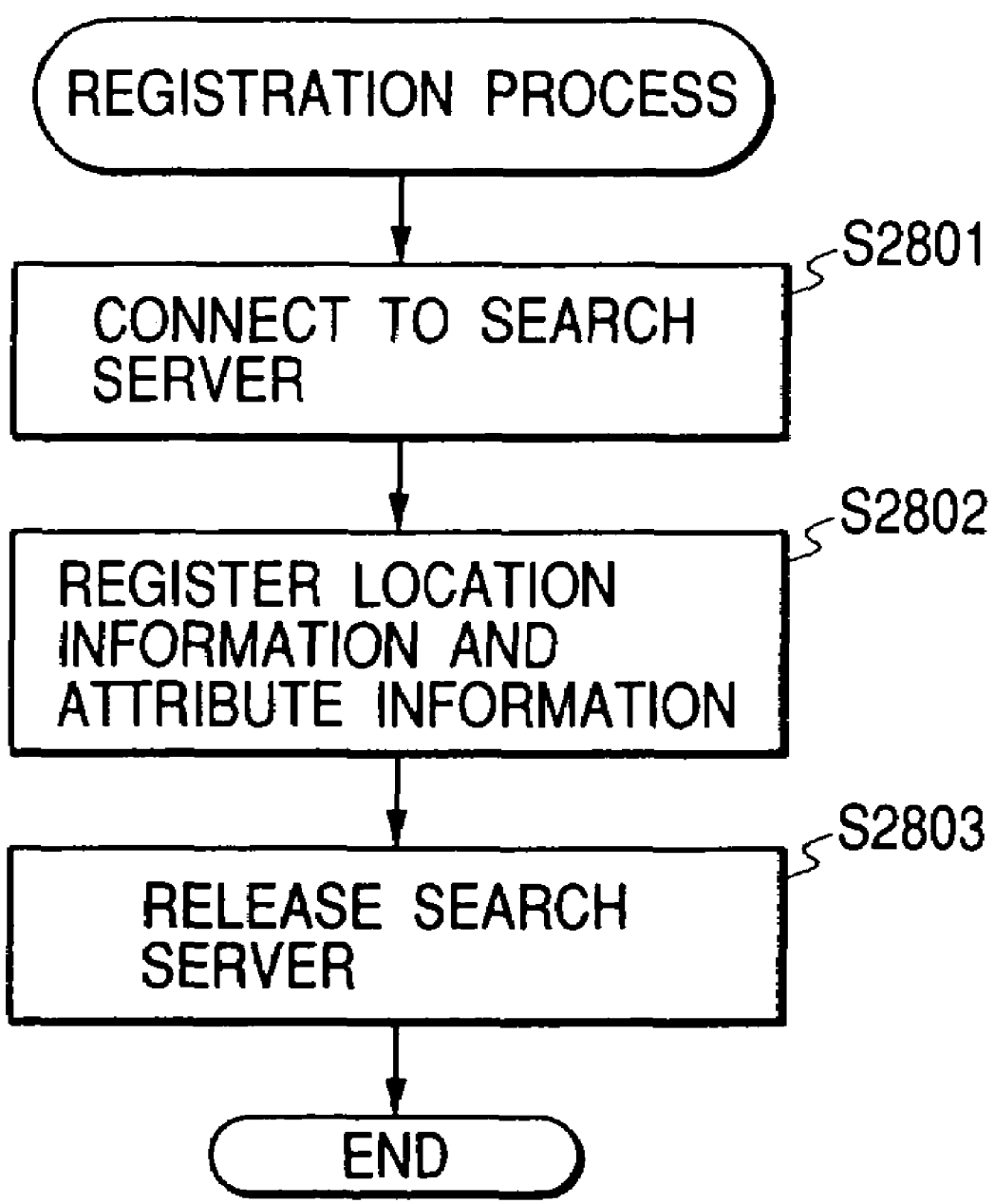
FIG. 28 is a flow chart illustrating a registration process.

With reference to the flow chart shown in FIG. 28, a process of registering device hierarchical location information will be described. The color printer 101 (LBP1110) is used by way of example in the following description.

LBP1110 stores the hierarchical location information and attribute information in the non-volatile RAM 2312 serving as a device location storing means. When a power is turned on, CPU 2302 of LBP1110 establishes a connection to the server 112 (Step S2801). After the connection, LBP1110 reads the hierarchical location information and attribute information from the non-volatile RAM 2312, sends the device registration data shown in FIG. 10 to the server 112 which registers it in the database (Step S2802).

If the hierarchical location information is still not registered in the device, the hierarchical location information with data not being set at 903, 905 to 911 or with meaningless data being set is transmitted to the server.

After the registration, CPU 2302 of LBP1101 releases the connection to the server 112 (Step S2803). With these steps, after the power is turned on, each device registers the hierarchical location information and attribute information in the server 112.

Figure 24:
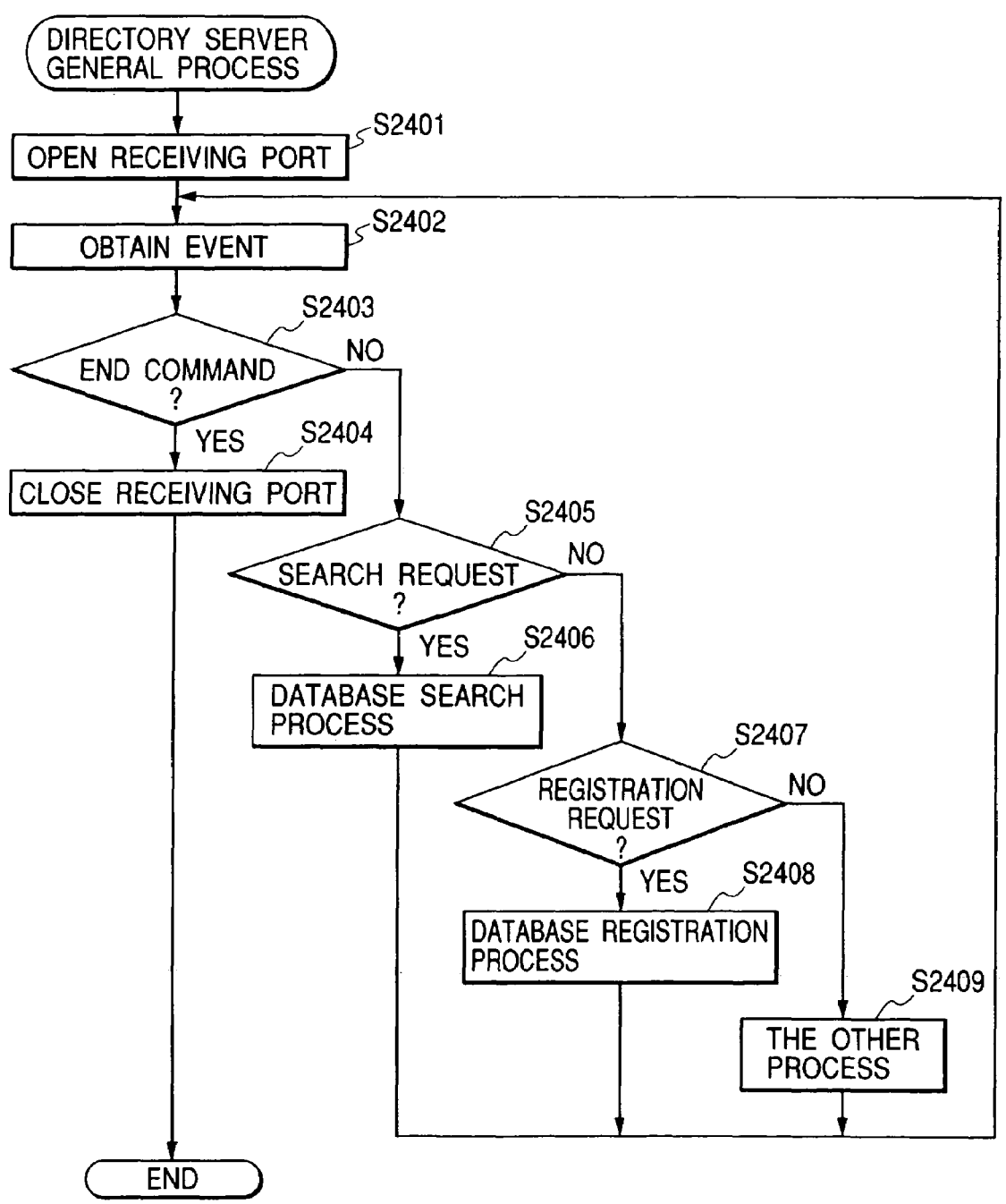
FIG. 24 is a flow chart illustrating the overall operation of a server computer.

Next, with reference to the flow chart of FIG. 24, the operation of the server will be described. The server 112 runs an event driven type program, and when an event occurs, analyzes it and executes a corresponding process.

When a power is turned on, the server 112 first opens a reception port (Step S2401). Next, an event is acquired (Step S2402) and judges whether the acquired event is an end command (Step S2403). If it is judged that the event is the end command, the reception port is closed (Step S2404) to terminate the process.

If it is judged at Step S2403 that the event is not the end command, it is judged whether the event is a search request from the client 111 or the like (Step S2405). In the case of the search request, a database search process is executed at Step S2406.

If it is judged at Step S2405 that the event is not the search request, it is judged at Step S2407 whether the even is a database registration request from the device. If it is judged that the event is the registration request, the received data is registered in the table 800 shown in FIG. 9 (Step S2408). This registered data is stored in HD 211. If it is judged at Step S2407 that the event is another request, another process is executed (Step S2409).

Figure 25:
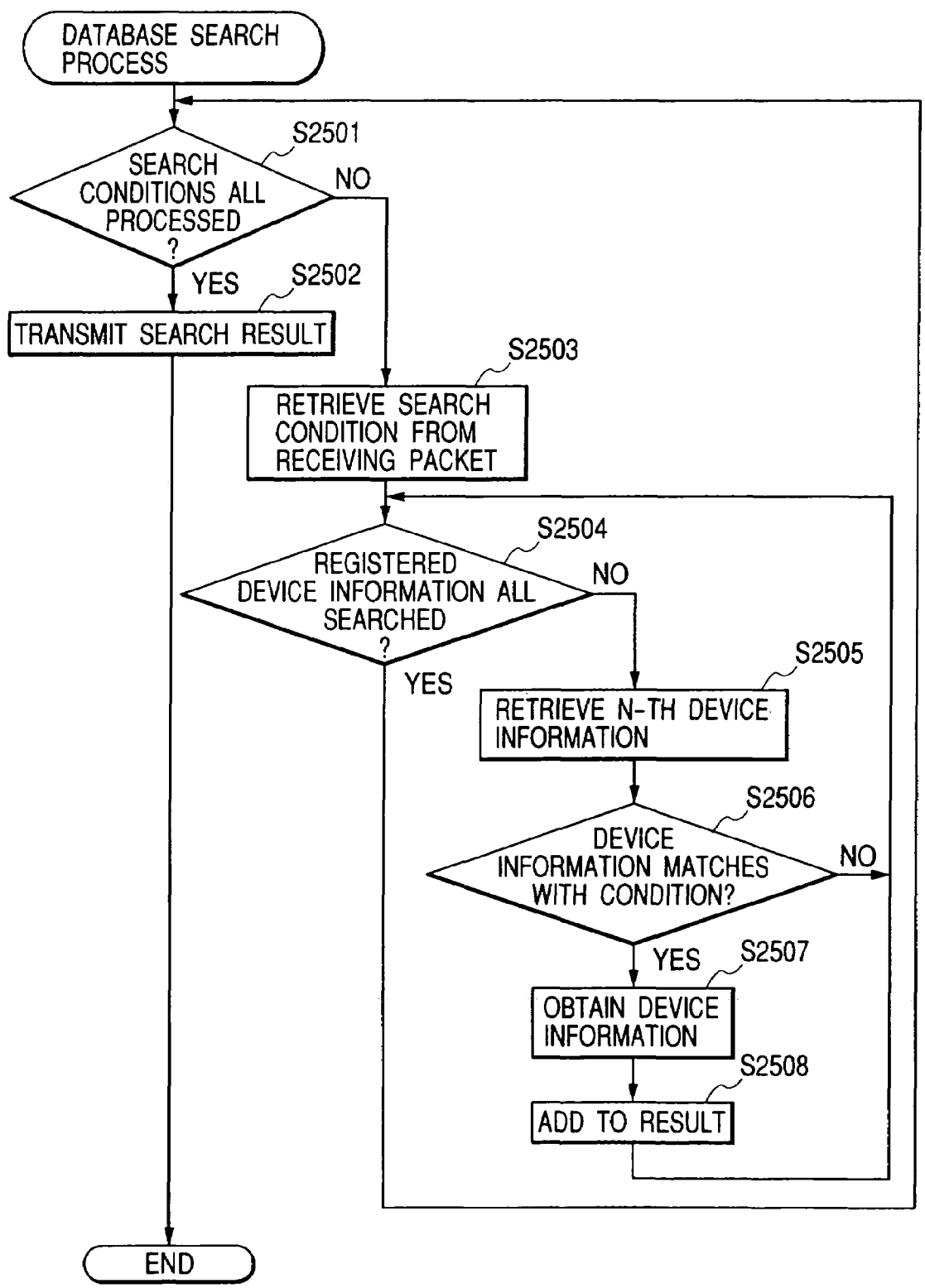
FIG. 25 is a flow chart illustrating a database search process.

Next, with reference to the flow chart shown in FIG. 25, a data search process (process at Step S2406) to be executed by the server will be detailed.

In this search process, it is judged at Step S2501 whether all search conditions have been processed. Until all search conditions have been processed, this search process is repeated.

If all search conditions on a reception packet have been searched at Step S2501, the search result is transmitted to the client (Step S2502).

If all search conditions have not been searched, the flow advances to Step S2503 whereat the next search condition is acquired from the reception packet. It is judged whether all registration device information in the table shown in FIG. 9 has been searched for the acquired search condition (Step S2504).

If it is judged that all registration device information has been searched, the flow returns to Step S2501.

If it is judged at Step S2504 that all registration device information has not been searched, the flow advances to Step S2505 whereat device information of an n-th device is read from HD 211. It is checked whether the read device information satisfies the search condition (Step S2506).

If it is judged that the read device information satisfies the search condition, the device information is acquired (Step S2507) and added to the search result (Step S2508).

If it is judged at Step S2506 that the device information does not satisfy the search condition, the flow returns to Step S2504 for the next device. Devices in the table 800 shown in FIG. 9 are all searched for each search condition, and the search result is transmitted to the client.

Next, the overall operation of the client 111 will be described.

The client 111 runs an event driven type program, and when an event occurs, analyzes it and executes a corresponding process.

Figure 26:
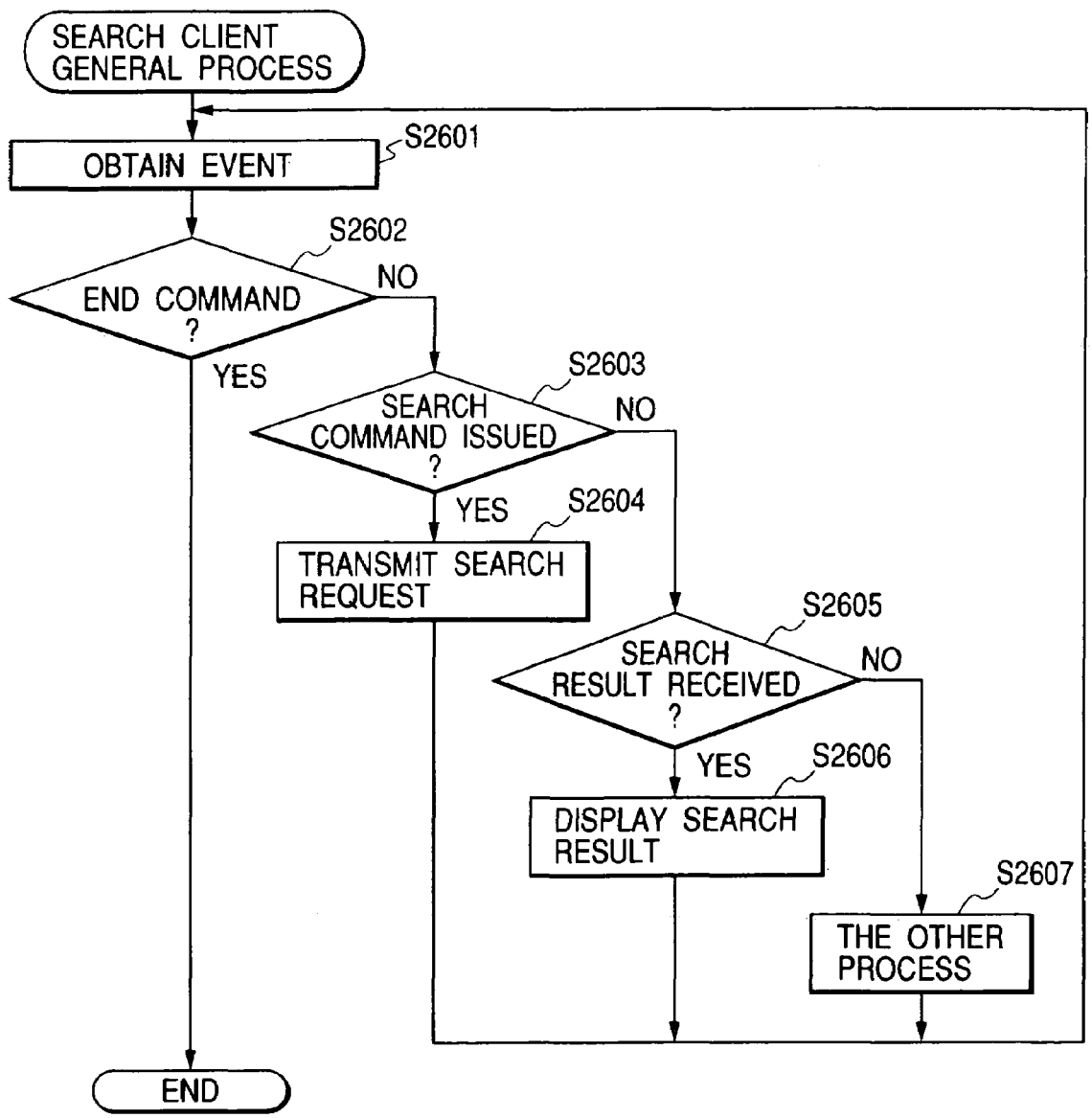
FIG. 26 is a flow chart illustrating the overall operation of a client computer.

As shown in the flow chart of FIG. 26, the client 111 first acquires an event at Step S2601. If the event of the end command is received, the process is terminated (Step S2602).

On the client 111 side, a user enters search conditions from the search condition input window shown in FIG. 11. When the user activates the search start button 1005, an event occurs.

If it is judged at Step S2603 that the event is a request of issuing a search command, the client 111 transmits the search request to the server 112 (Step S2604).

In this case, the search condition equation such as shown in FIGS. 12 and 13 is used to transmit the search request to the server. If this search condition equation is stored in HD 211, this equation can be used when the same search is executed later, to omit the user input of the equation.

The client 111 waits for the search result from the server. It is checked at Step S2605 whether an event of the search result is received. If it is judged at Step S2605 that the search result such as shown in FIG. 14 is received, a search result display process is executed (Step S2606). If another event is received, a corresponding process is executed (Step S2607).

Figure 27:
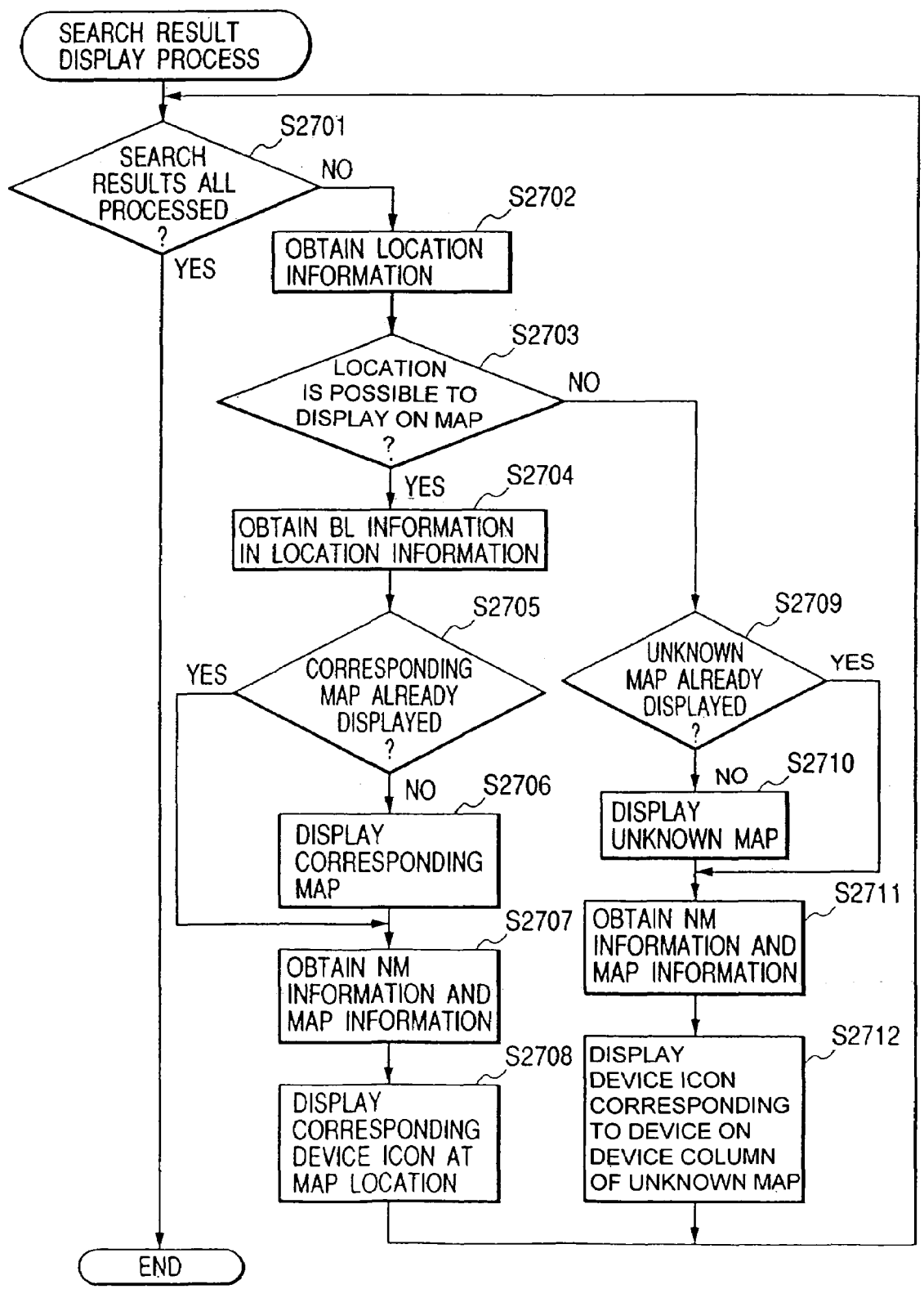
FIG. 27 is a flow chart illustrating a search result display process.

Next, with reference to the flow chart shown in FIG. 27, the search result display process will be detailed.

First, at Step S2701, it is judged whether all search results have been processed. If it is judged that all search results have been processed, the process is terminated.

If it is judged at Step S2701 that all search results have not been processed, the flow advances to Step S2702 whereat the hierarchical location information is acquired from the received search result. In accordance with the acquired hierarchical location information, it is judged whether the client can display a layout bit map (Step S2703).

The judgement at Step S2703 that the layout bit map can be displayed or not means the device information received as the search results contains the hierarchical location information shown in FIG. 4 or not. If not contained, it means that the device hierarchical location information is not registered in the server 112.

In this embodiment, the device hierarchical location information capable of being displayed contains the hierarchical location information which includes the information indicated by reference numeral 1401 in FIG. 15. If the hierarchical location information does not include this information, it is confirmed whether an unknown map is already displayed (Step S2709) and the unknown map shown in FIG. 20 is displayed (Step S2710).

The NM information is derived from the hierarchical location information (Step S2711) and the device icon corresponding to the NM information is displayed in the area 1902 shown in FIG. 20. In this case, the device unable to be normally displayed, i.e., the device whose hierarchical location information is still not registered, is displayed in this area.

If it is judged at Step S2703 that the device can be displayed, the BL information is derived from the hierarchical location information (Step S2704). The client displays the necessary layout bit map by referring to the BL information table shown in FIG. 15 by using the BL information as a key.

It is checked whether the corresponding layout bit map is already displayed (Step S2705). If it is judged that the layout bit map is not still displayed, the corresponding bit map is displayed (Step S2706). The NM information and layout bit map is acquired from the hierarchical location information (Step S2707).

If it is judged at Step S2705 that the layout bit map is already displayed, the flow advances to Step S2707. The device icon corresponding to the NM information is read from the table shown in FIG. 21. In accordance with the layout bit map, the display position of the device icon is determined.

With the above Steps, the layout bit map such as shown in FIGS. 5 to 8 is displayed on a display of the client 111, and the user can know the detailed location of the device.

With Steps S2705 to 2707, if a plurality of devices are found as the search results, the devices are displayed on the same layout bit maps or on different layout bit maps.

Device attribute information other than the location information may be displayed as a tool tip 701 such as shown in FIG. 7, which can be displayed for example by a predetermined operation on the device icon on the layout bit map.

In this embodiment, since the search result shown in FIG. 14 is returned from the server 112, it can be known that NM is LBP1110 and the coordinate is "10X+10Y". Therefore, the client displays the device icon on the device bit map at the position shown in FIG. 22 (Step S2708). This device bit map is superposed upon the layout bit map to display the search result.

Next, an operation of the client 111 for registering the hierarchical location information of a searched device in the database of the server 112 will be described.

Figure 30:
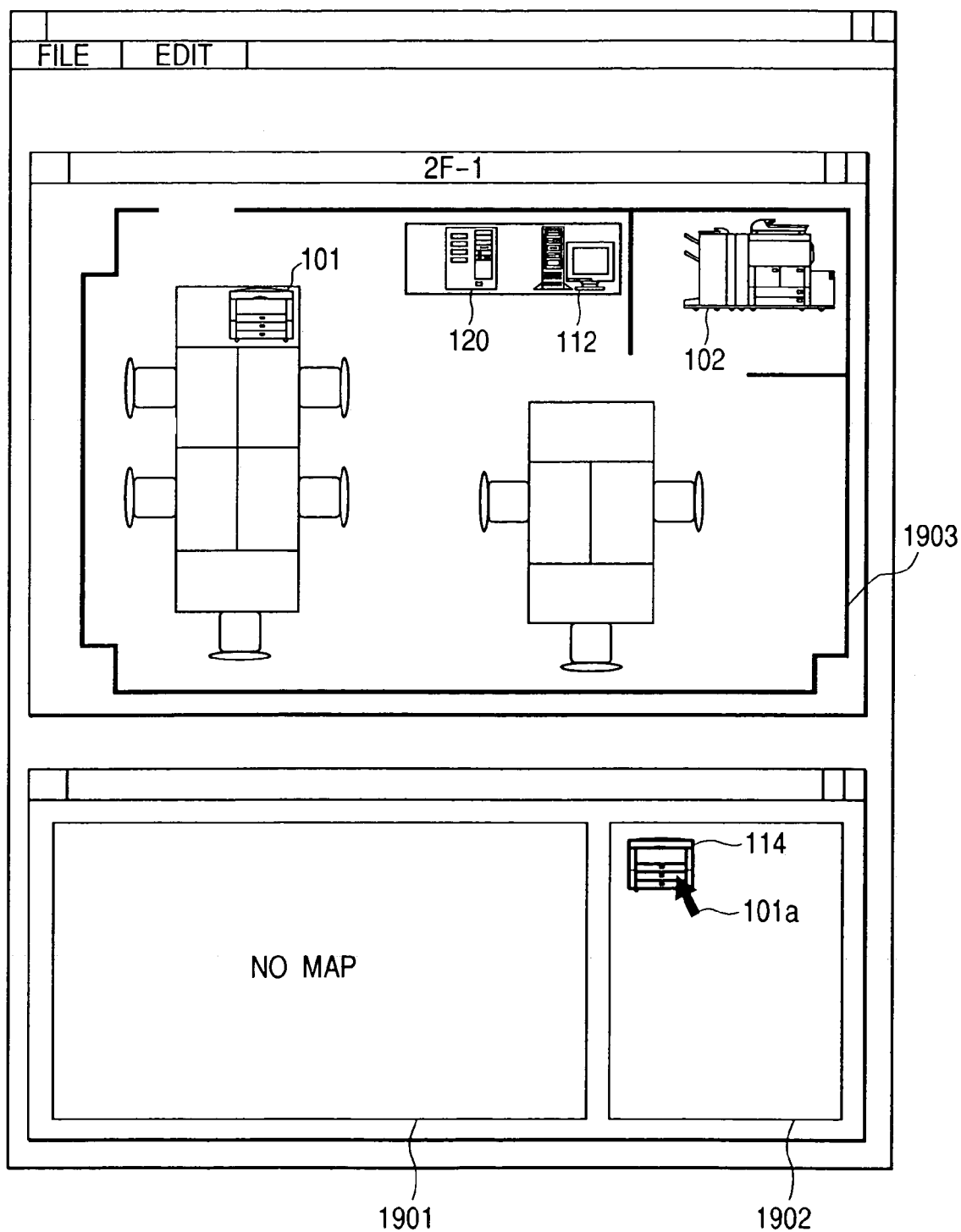
FIG. 30 is a diagram illustrating the case that the device search result showed no corresponding map.

FIG. 30 is a diagram showing an example of the search result displayed at the client 111 after the operation illustrated in the flow chart of FIG. 27.

The devices are displayed as icons in an area 1903 if the hierarchical location information is registered in the database 800 and there is the layout bit map corresponding to the hierarchical location information. Namely, the devices displayed as icons correspond to those displayed by the process at Step S2708.

The device displayed is an icon in an area 1902 if the hierarchical location information is not registered in the database 800, the icon of this device being displayed by the process at step S2712.

The device is displayed as an icon in the area 1902 if the hierarchical location information is not registered in the database 800 and there is no layout bit map corresponding to the hierarchical location information.

The search result shown in FIG. 30 is displayed when the hierarchical location information of the printer at the IP address 814 of "192.1.2.1" shown in FIG. 9 is unknown. In this case, the map information for displaying the searched device on the layout bit map displayed at the client does not exist. In this embodiment, therefore, as shown in FIG. 30, an indication that there is no map information is displayed in the first area 1901 and the icon of the color printer 114 shown in FIG. 2 is displayed in the second area 1902 as the device not having the hierarchical location information or not coincident with the hierarchical location information.

The search result shown in FIG. 30 is displayed when the hierarchical location information of the printer at the IP address 814 of "192.1.2.1" shown in FIG. 9 is unknown. In this case, the map information for displaying the searched device on the layout bit map displayed at the client does not exist. In this embodiment, therefore, as shown in FIG. 30, an indication that there is no map information is displayed in the first area 1901 and the icon of the color printer 114 shown in FIG. 2 is displayed in the second area 1902 as the device not having the hierarchical location information or not coincident with the hierarchical location information.

Figure 31:
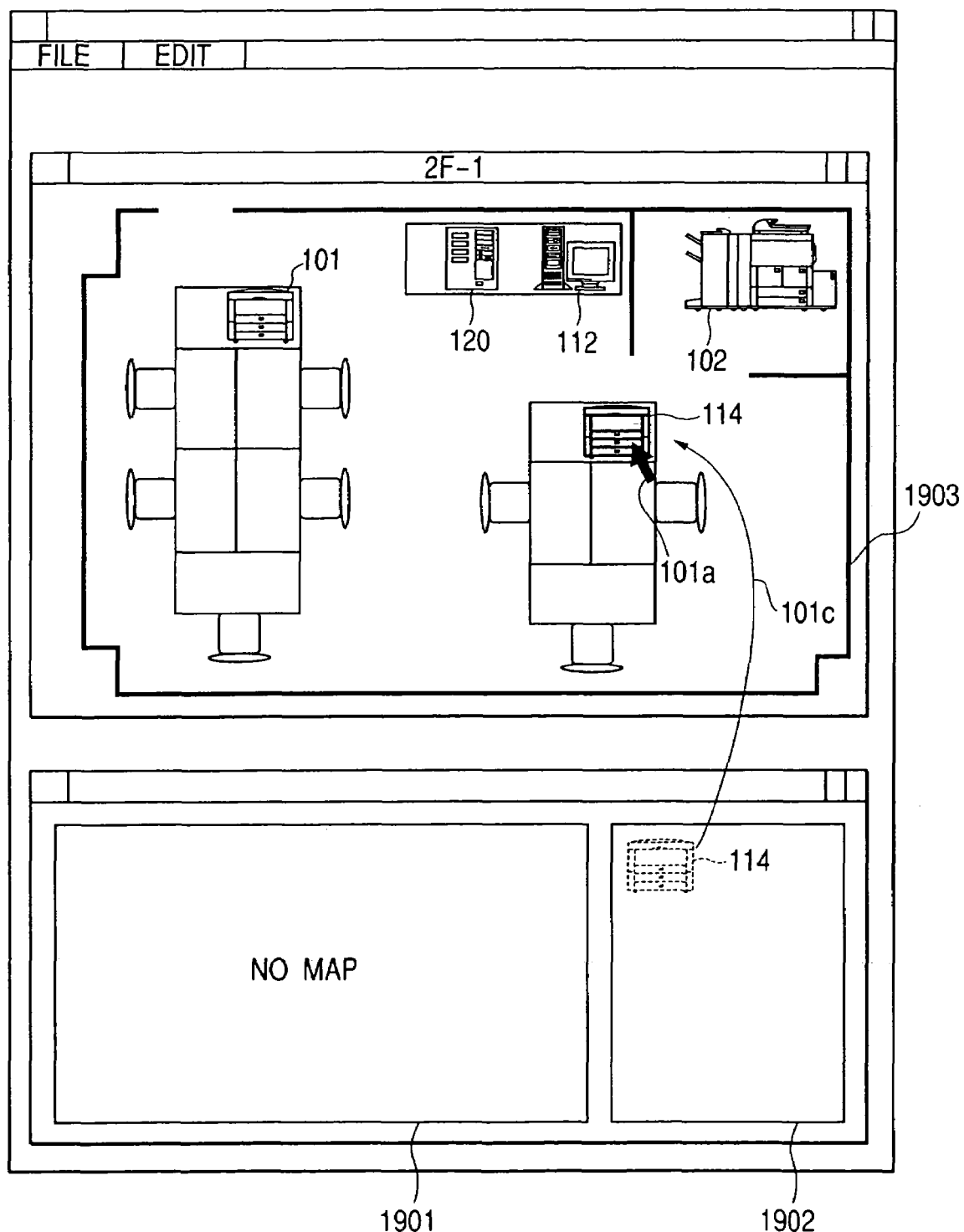
FIG. 31 is a diagram illustrating the case that a user moves a device with a mouse.

The color printer displayed in the second area 1902 is dragged with a cursor 101a of the mouse and dropped at a desired position in the area 1903 of the layout bit map as indicated by an arrow 101c in FIG. 31.

Figure 32:
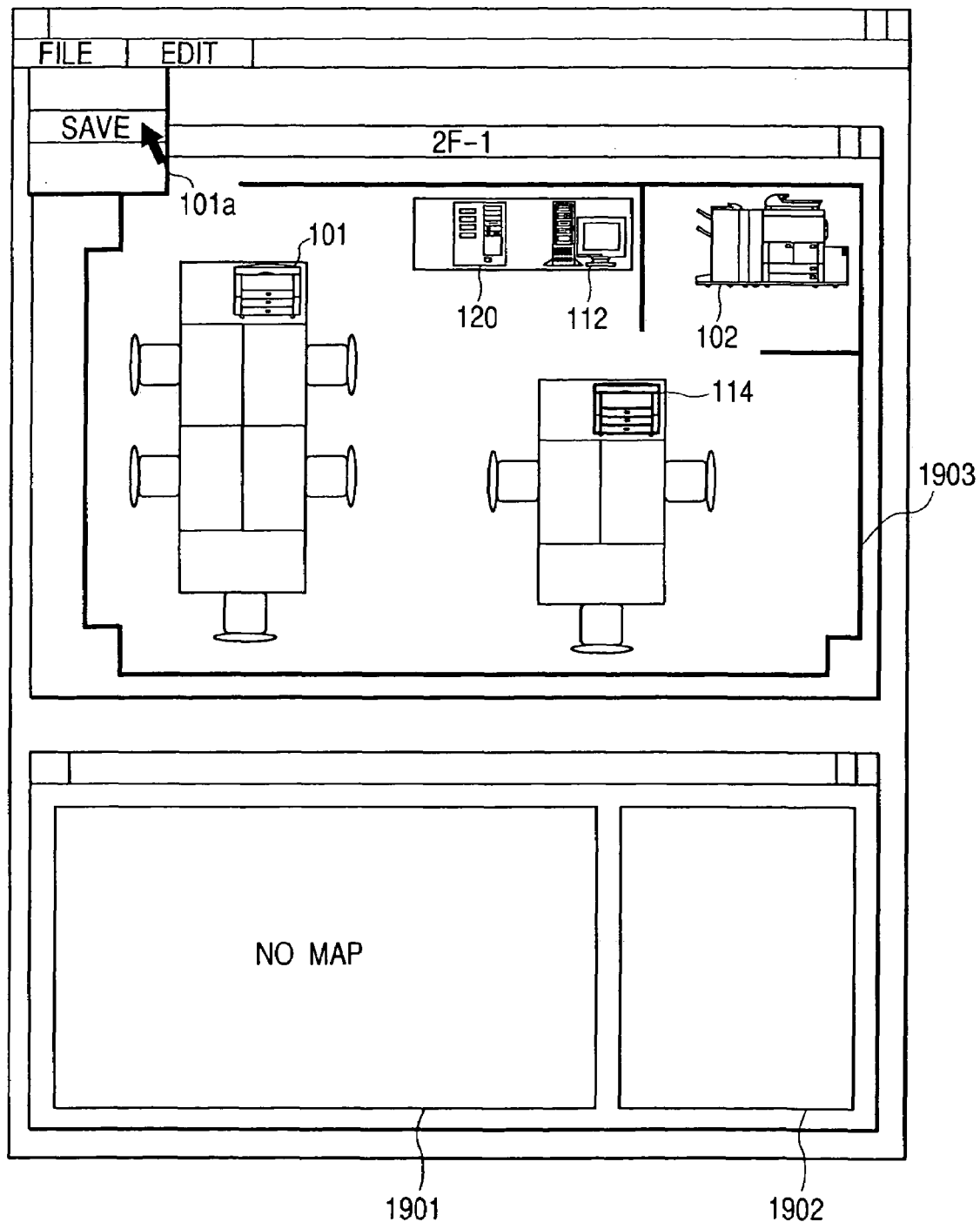
FIG. 32 is a diagram illustrating the case that the user registers changed hierarchical location information.

After the position of the printer 114 is changed, as shown in FIG. 32, a store window is opened to execute a store process. Another process is also executed to notify the device of the changed hierarchical location information by using a device location information notifying unit.

In response to this store process, a coordinate "10X+20Y" of the position where the device icon 114 was dropped is acquired and then the hierarchical location position corresponding to the dropped device is acquired.

Figure 35:
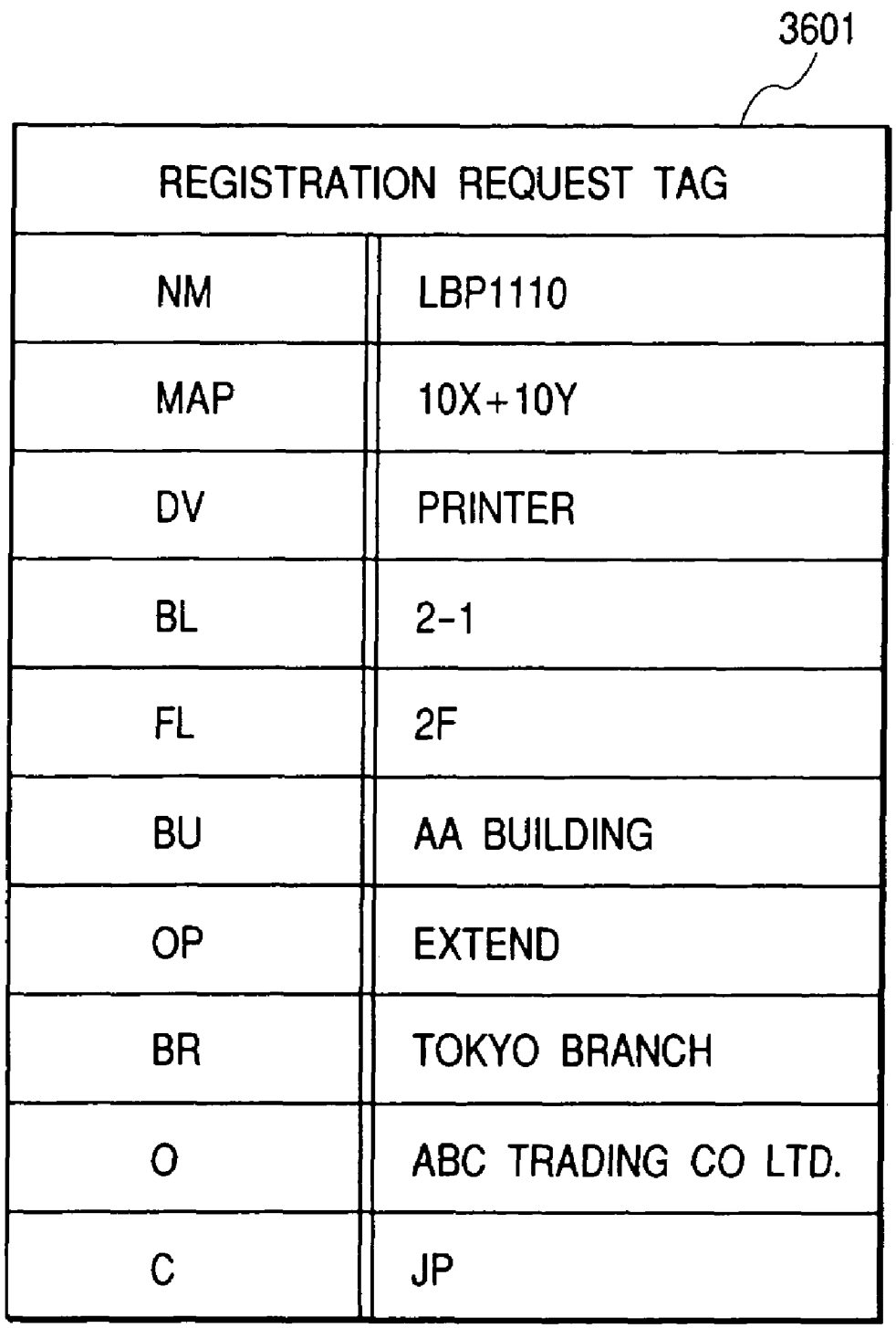
FIG. 35 is a diagram showing an example of a registration request tag.

In accordance with the acquired coordinate information and hierarchical location information, a registration request tag 3601 shown in FIG. 35 is automatically formed and transmitted to the device (LBP1110) corresponding to the registration request tag 3601.

The device (LBP1110) supplied with the hierarchical location information requests the server 112 to register the hierarchical location information in the manner described earlier.

Next, the operation of the client for transmitting the registration request tag 3601 and the operation of the device for registering the hierarchical location information in the server 112 in accordance with the registration request tag 3601 received by the device, will be described.

Figure 33:
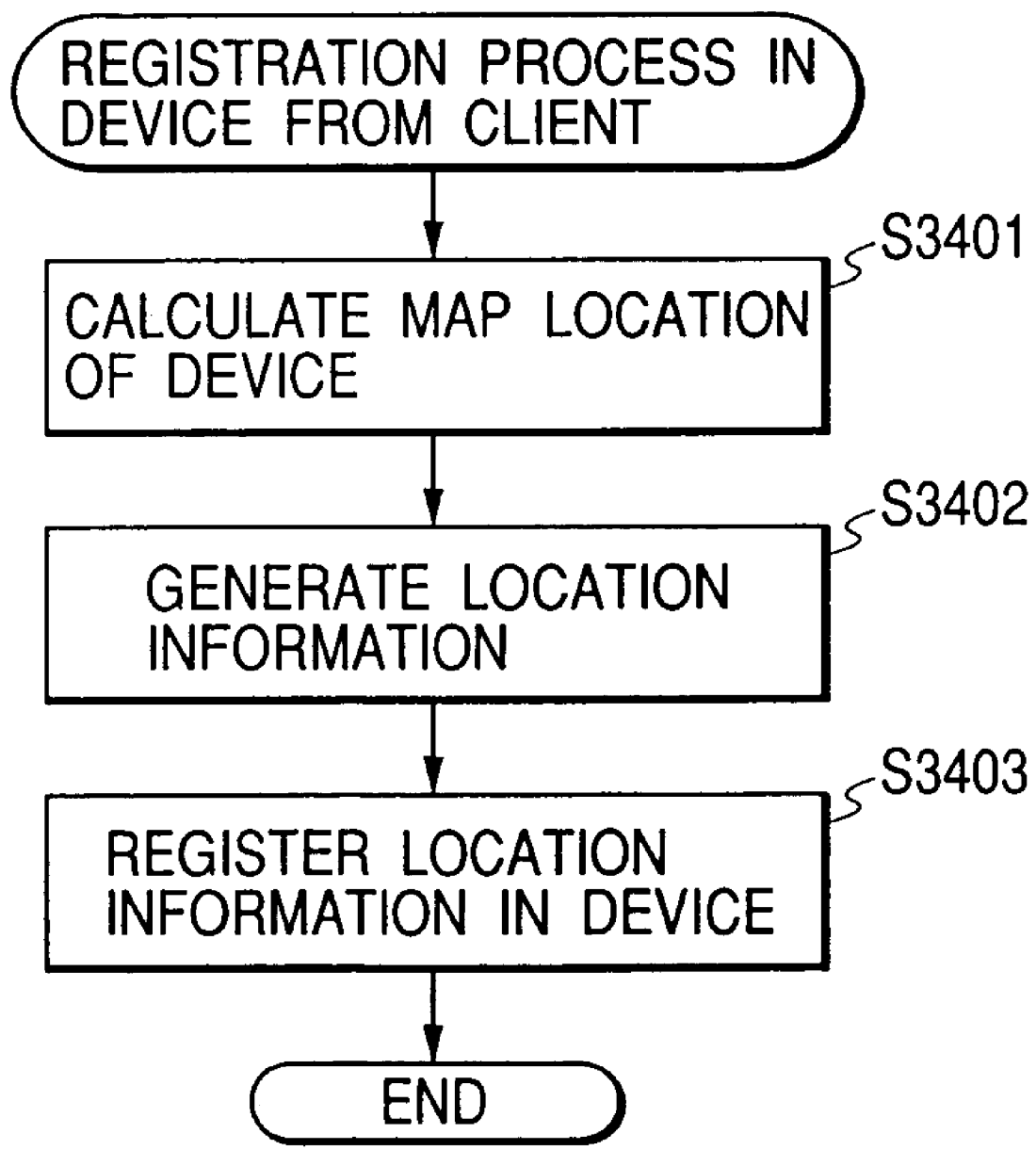
FIG. 33 is a flow chart illustrating a registration process from a client to a server.

The flow chart shown in FIG. 33 illustrates a process of registering the hierarchical location information from the client 111 to the device.

As shown in FIG. 33, as the process starts, the position of the device on the map is calculated at Step S3401. At Step S3402, the changed hierarchical location position is calculated.

At Step S3403 the hierarchical location information generated at Step S3402 is notified to the device which stores it in a hierarchical location information registration unit.

Figure 34:
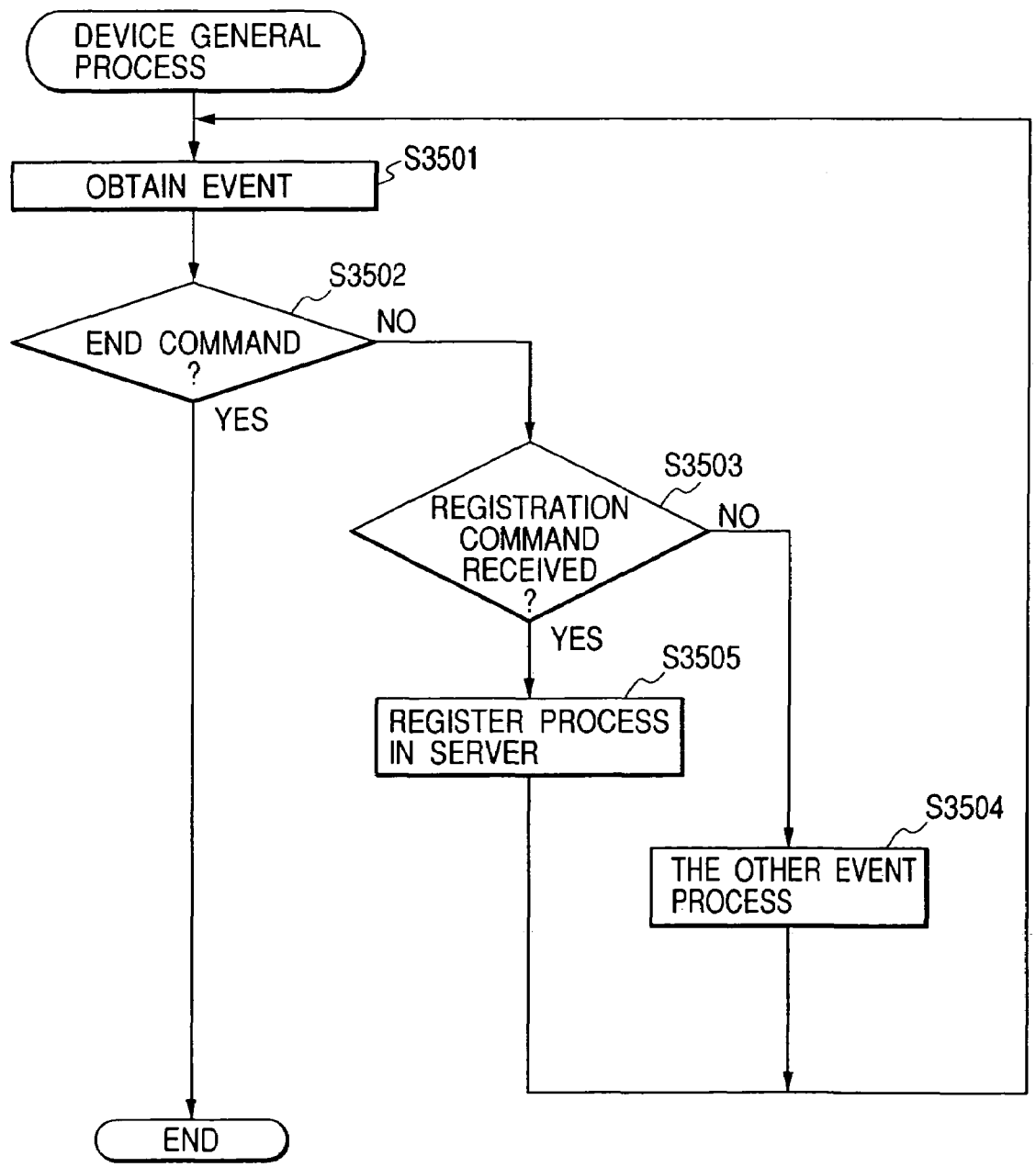
FIG. 34 is a flow chart illustrating a process to be executed when a device receives a command.

The flow chart shown in FIG. 34 illustrates a process to be executed when the hierarchical location information is notified.

First, at Step S3501, an event is acquired. Next, at Step S3502 it is checked whether the event is an end command. If an end command, the process is terminated.

If not an end command, the flow advances to Step S3503 whereat it is judged whether the acquired command is a registration command. If a registration command, the flow advances to Step S3503 whereat a process of registering in the server 112 is executed. If it is judged at Step S3503 that the acquired command is not a registration command, the flow advances to Step S3504 whereat another event is processed.

The changed hierarchical location information may not be notified to the device, but it may be notified to the server to collectively manage the hierarchical location information of each device at the server.

With the above operations, the hierarchical location information of the device "LBP1110" not registered in the database shown in FIG. 9 is automatically registered as shown in FIG. 36.

The hierarchical location information of a device newly connected to the network and still not registered can be automatically registered in the device and database managed by the server, with very simple operations such as acting upon the icon on the layout bit map.

Second Embodiment

In the second embodiment, a system will be described in which when the location of a device on the network is changed, the hierarchical location information of the device is changed.

A different point of the second embodiment from the first embodiment is whether the hierarchical location information of a device is already registered in the database 800 when the device is found.

More specifically, in the first embodiment, a new device is connected to the network so that when the device is found, the hierarchical location information of the device is not still registered in the database 800. On the other hand, in the second embodiment, the location of a device already connected to the network is changed so that when the device is found, the hierarchical location information of the device before location transfer is already stored in the database 800.

Therefore, in the first embodiment, the icon of the found device is displayed in the unknown map of the client 111, whereas in the second embodiment, the icon is displayed at the client 111 on the layout bit map at the location before location transfer.

The second embodiment will be described mainly taking as examples the search result displays at the client 111.

Figure 51:
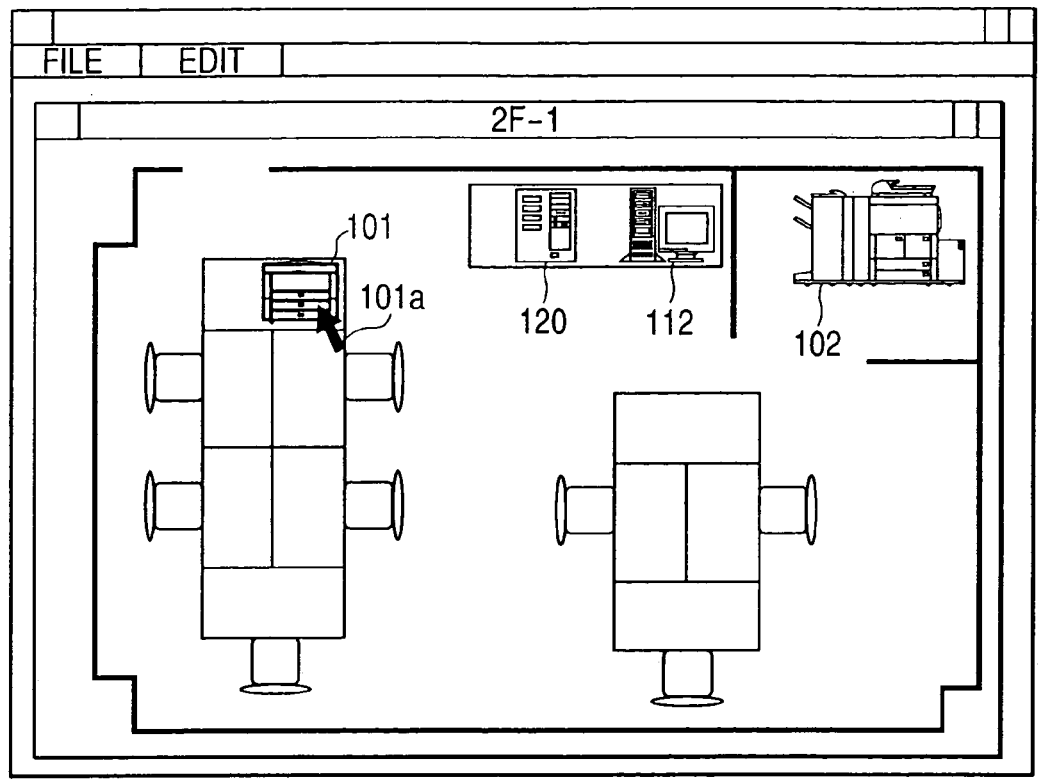
FIGS. 51, 52 and 53 are diagrams illustrating an operation of changing the location of a device according to a second embodiment of the invention.
Figure 52:
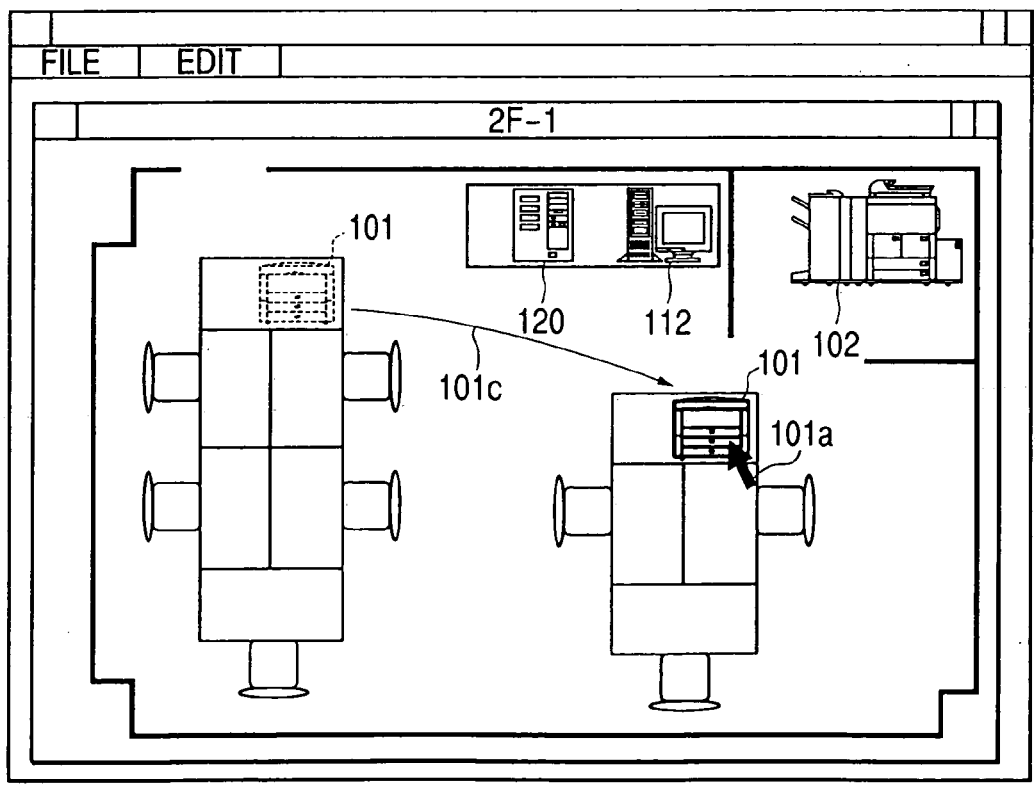
Figures 53, 54:
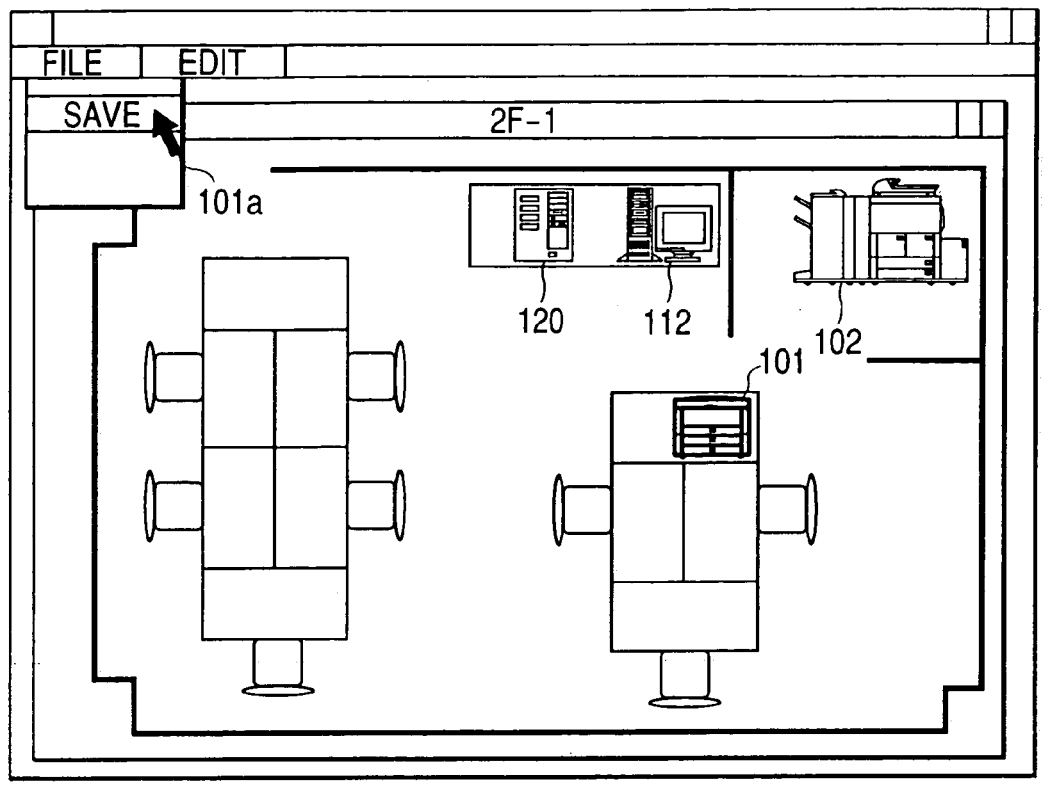
FIG. 54 is a diagram showing an example of a registration request tag according to the second embodiment.

FIGS. 51 to 53 show an example of a process of changing the location of a device icon 101 displayed on the display of the client 111, by using a hierarchical location changing unit.

In this example, a printer 101 displayed on the display screen is dragged with a cursor 101a and dropped on another desk as indicated by an arrow 101c in FIG. 52.

After the position of the printer 101 is changed, as shown in FIG. 53 a store window is opened to execute a store process.

In response to this store process, a coordinate "30X+20Y" of the position where the device icon 101 was dropped is acquired and then the hierarchical location position corresponding to the dropped device is acquired.

In accordance with the acquired coordinate information and hierarchical location information, a registration request tag 3602 shown in FIG. 54 is automatically formed and transmitted to the device (LBP1110) corresponding to the registration request tag 3602.

The device (LBP1110) supplied with the hierarchical location information requests the server 112 to register the hierarchical location information similar to the first embodiment.

Similar to the first embodiment, the changed hierarchical location information may not be notified to the device, but it may be notified to the server to collectively manage the hierarchical location information of each device at the server.

In the first and second embodiments, the client searches a device by using the database managed by the server. The invention may be applied other various fields.

For example, in a network system not having a directory server, in response to broadcast or multicast by a device search protocol such as SLP to be executed by a computer on the network, the hierarchical location information may be set to its response packet. The hierarchical location information is changed or registered at a computer receiving the response packet by acting upon an icon on the layout bit map.

Third Embodiment

In the third embodiment, a system will be described wherein when a new device is found on the network, the hierarchical location information of the device is registered.

In the first and second embodiments, the client 111 has layout bit maps representative of the locations of found devices. A different point of the third embodiment from the first and second embodiments is that the server 112 has layout bit maps and transmits the layout bit map of the found device to the client 111.

Different points from the first embodiment will be described mainly in the third embodiment.

In the third embodiment, stored in the hard disk of the server 112 are the layout bit maps shown in FIGS. 16 to 20, correspondence table between the hierarchical location information and layout bit maps shown in FIG. 15, and device icon information shown in FIG. 21.

The operation of the server 112 different from the first embodiment will be described.

Figure 49:
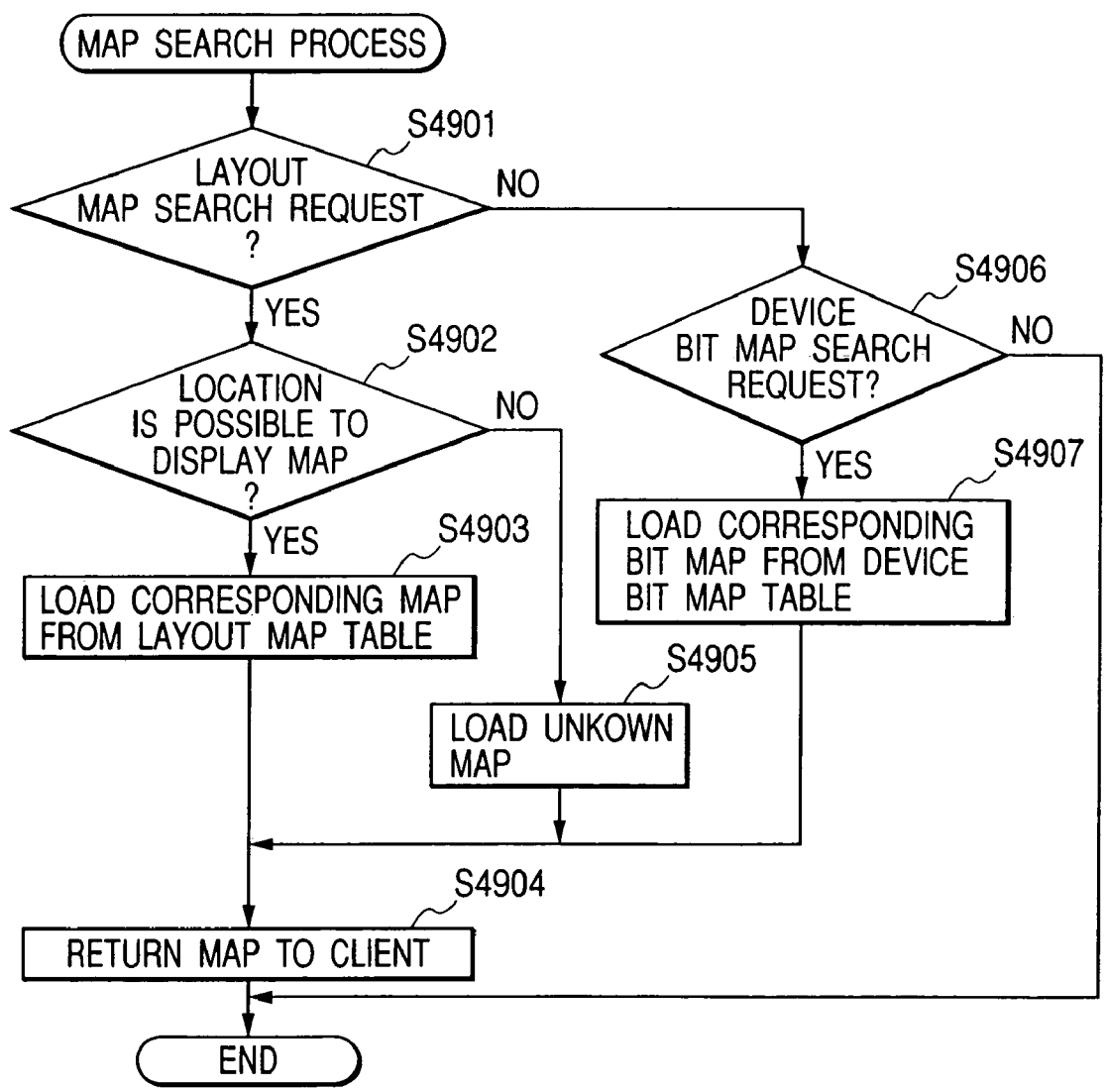
FIG. 49 is a flow chart illustrating the operation of a server computer according to a third embodiment.

FIG. 49 is a flow chart illustrating a process of the server 112 for searching a layout bit map corresponding to the device searched in accordance with the search condition supplied from the client 111, and transmitting the searched layout bit map to the client. The search process of the layout bit map is executed as one event process at Step S2409 of FIG. 24.

With reference to the flow chart shown in FIG. 49, the search process of a layout bit map will be described.

First, it is checked at Step S4901 whether an event is a search request for a layout bit map. If a search request, the flow advances to Step S4902 whereat it is judged whether the location can be displayed as a layout bit map.

If it can be displayed as a layout bit map, the flow advances to Step S4903 whereat the corresponding layout bit map is acquired from the layout table. Next, at Step S4904 the acquired map information is returned to the client 111. If it is judged at Step S4902 that the location cannot be displayed as a layout bit map, the flow advances to Step S4905 whereat an unknown map is acquired.

The search process for a layout bit map is executed in accordance with a designation of the block hierarchical level (BL) by the client 111.

If it is judged at Step S4901 that the event is not a search request for a layout bit map, the flow advances to Step S4906 whereat it is checked whether the event is a search request for a device icon. If a device icon, at Step S4907 the corresponding device icon is acquired from the device icon table shown in FIG. 21.

The search process for a device icon is executed in accordance with the device identification information (NM) supplied from the client 111.

Next, at Step S4904 the acquired device icon is returned to the client 111. If it is judged at Step S4906 that the event is not the device icon search request, the search process is terminated.

Next, the operation of the client 111 different from the first embodiment will be described.

Figure 50:
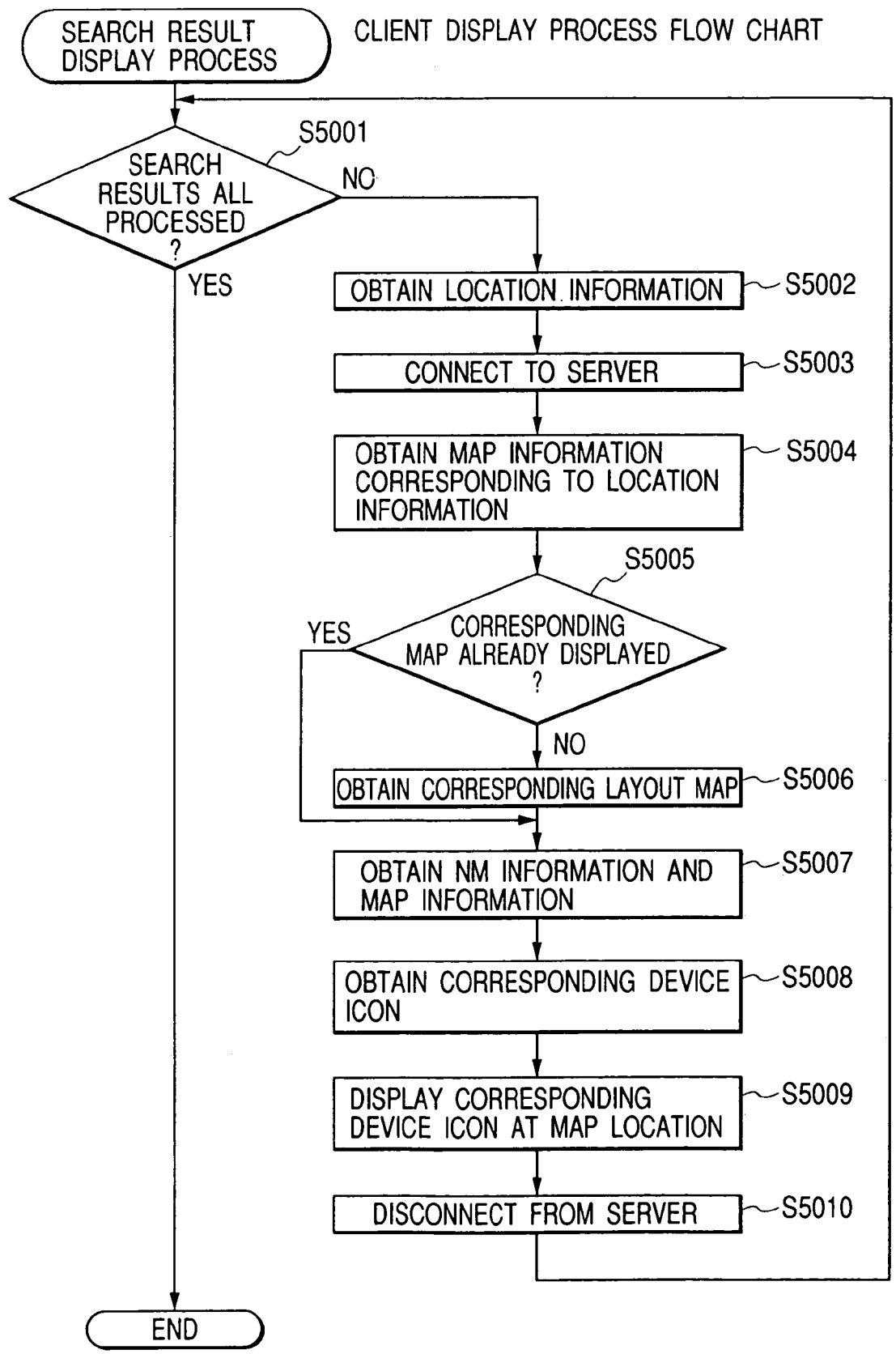
FIG. 50 is a flow chart illustrating the operation of a client computer according to the third embodiment.

FIG. 50 is a flow chart illustrating a process of displaying a search result at the client 111. In the third embodiment, the flow chart shown in FIG. 27 of the first embodiment is replaced by the flow chart shown in FIG. 50.

With reference to the flow chart of FIG. 50, the search result display process will be described.

First, at Step S5001, it is judged whether all search results have been processed. If it is judged that all search results have been processed, the process is terminated.

If it is judged at Step S5001 that all search results have not been processed, the flow advances to Step S5002 whereat the hierarchical location information is acquired from the received search result. In accordance with the acquired hierarchical location information, it is judged whether the client 111 can display a layout bit map (Step S5003).

In this embodiment, the device hierarchical location information capable of being displayed contains the hierarchical location information which includes the information indicated by reference numeral 1401 in FIG. 15. If the hierarchical location information does not include this information, it is confirmed whether an unknown map is already displayed (Step S5009) and the unknown device shown in FIG. 20 is displayed (Step S5010).

The NM information is derived from the hierarchical location information (Step S5011) and the device icon corresponding to the NM information is displayed in the area 1902 shown in FIG. 20. In this case, the device unable to be normally displayed, i.e., the device whose hierarchical location information is still not registered, is displayed in this area.

If it is judged at Step S5003 that the device can be displayed, the BL information is derived from the hierarchical location information (Step S5004). The client displays the necessary layout bit map by referring to the BL information table shown in FIG. 15 by using the BL information as a key.

It is checked whether the corresponding layout bit map is already displayed (Step S5005). If it is judged that the layout bit map is not still displayed, the corresponding bit map is displayed (Step S5006). The NM information and layout bit map is acquired from the hierarchical location information (Step S5007).

If it is judged at Step S5005 that the layout bit map is already displayed, the flow advances to Step S5007.

At Step 5007, the corresponding device icon is acquired from the server in accordance with the NM information.

At Step S5008, the location of the device icon to be displayed is determined from the map information.

Figure 18:
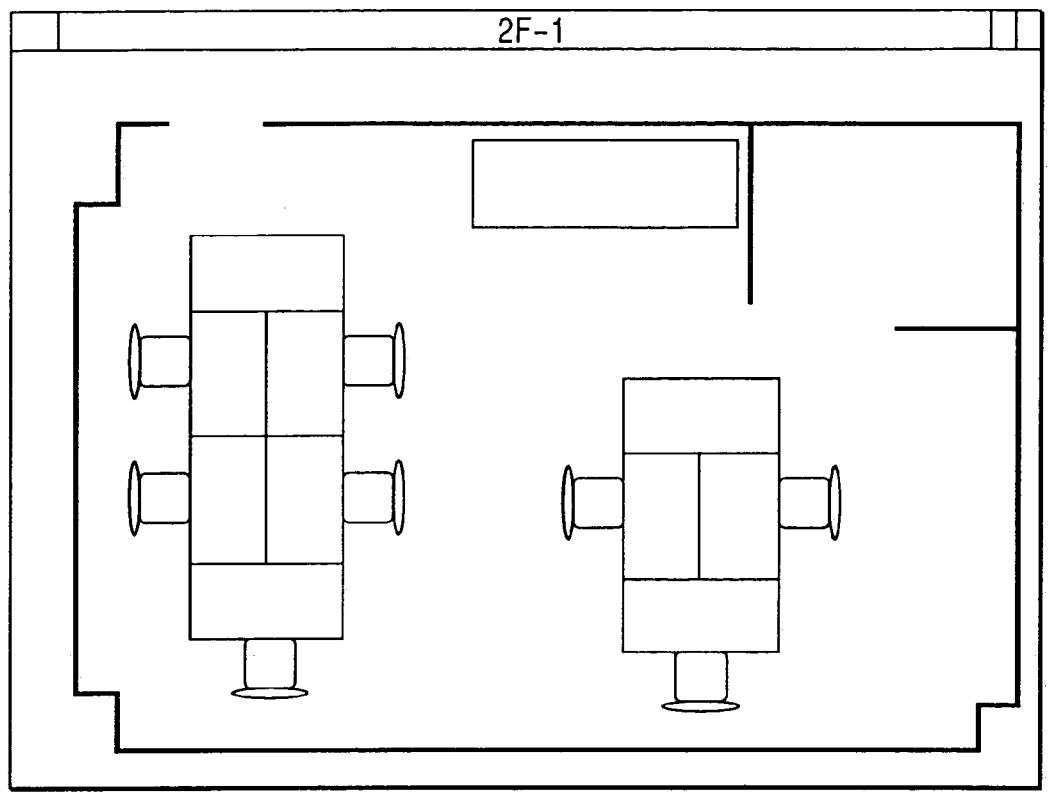
FIG. 18 is a diagram showing a layout bit map managed by the client computer.
Figure 19:
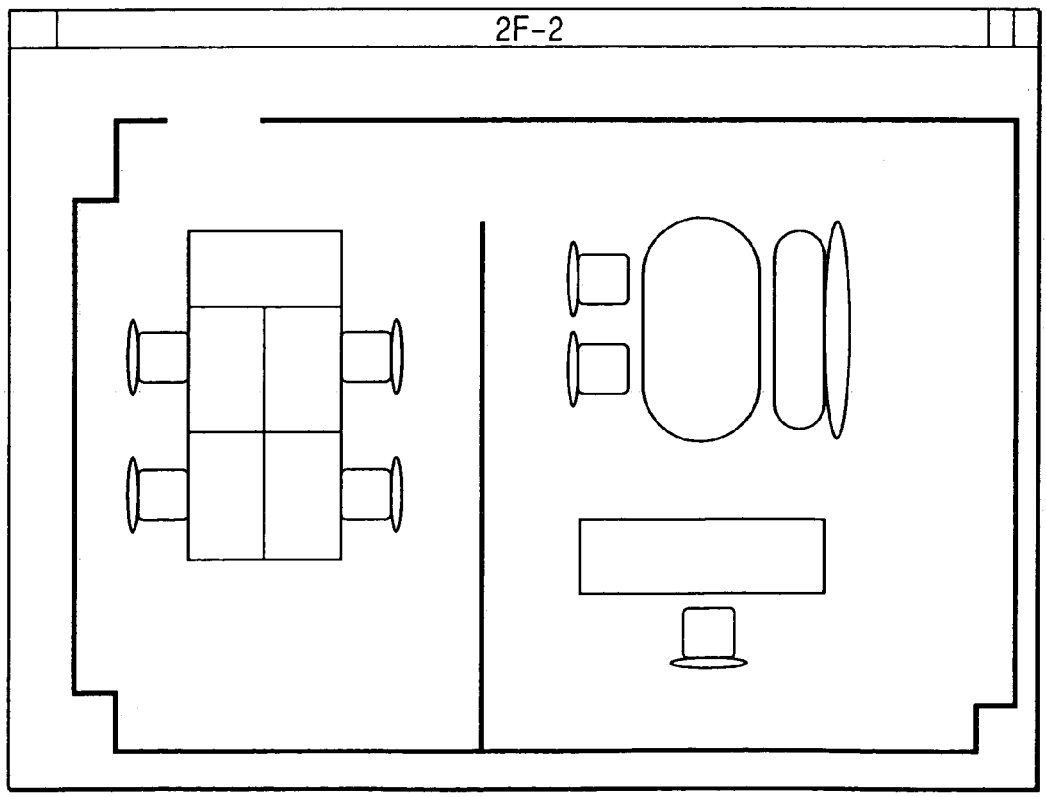
FIG. 19 is a diagram showing a layout bit map managed by the client computer.

For example, if the search result from the server 112 is as shown in FIG. 14, the device icon corresponding to LBP1110 is displayed on the layout bit map shown in FIG. 18 at the coordinate "10X+10Y".

In the first and second embodiments, the layout bit maps are stored in the client. Therefore, when the search result is displayed at the client, the server is not required to transfer a layout bit map to the client. It is therefore possible to reduce a load of the display process and shorten the display time, and also mitigate traffics of the network system.

In the third embodiment, the layout bit maps are stored in the server. Therefore, map information can be collectively managed by the server, and the client is not required to store the map information. It is therefore possible to make maintenance such as updating easy and reduce a load on memory resources of the client.

Either the first or third embodiment can be adopted in accordance with the load on the network system and the client performance.

Fourth Embodiment

In the first to third embodiments, only the layout bit maps corresponding to the block (BL) hierarchical level are stored. In the fourth embodiment, the layout bit maps corresponding to each hierarchical level of the hierarchical location information are stored and reflected upon the search result display at the client 111.

In the fourth embodiment, the searched device can be displayed on a layout bit map at the hierarchical level desired by a user, including the location information from rough location information at a building level to detailed location information at one block on one floor.

In the fourth embodiment, although the layout bit maps are stored in the client 111 similar to the first embodiment, the layout bit maps may be stored in the server 112 similar to the third embodiment.

The operation of the fourth embodiment will be described.

FIG. 37 is a list of layout bit maps corresponding to each hierarchical level to be searched. The lower half list shown in FIG. 37 corresponds to the list shown in FIG. 15. The device icon of the device is displayed in accordance with the attribute information one level lower than the attribute information at the hierarchical level to be searched. For the relation of hierarchical levels, refer to FIG. 4.

For example, if all devices are searched with BU=AA building, the attribute FL (refer to FIG. 4) under BU is used as the location information of devices to display the devices on the layout bit map. Some examples will be described with reference to the flow chart of FIG. 38.

If all devices in the ABC trading Co. Ltd. are searched, the company name (O) is selected from the pull-down menu and entered at 1001*a*, and the ABC trading Co. Ltd. is entered as the attribute value 1002*a*. The user thereafter activates the search start button 1005.

The client acquired the search result form the server by the procedure described with the above embodiments. In accordance with the search result acquired from the server, the client displays the device icon on the layout bit map.

Figure 38:
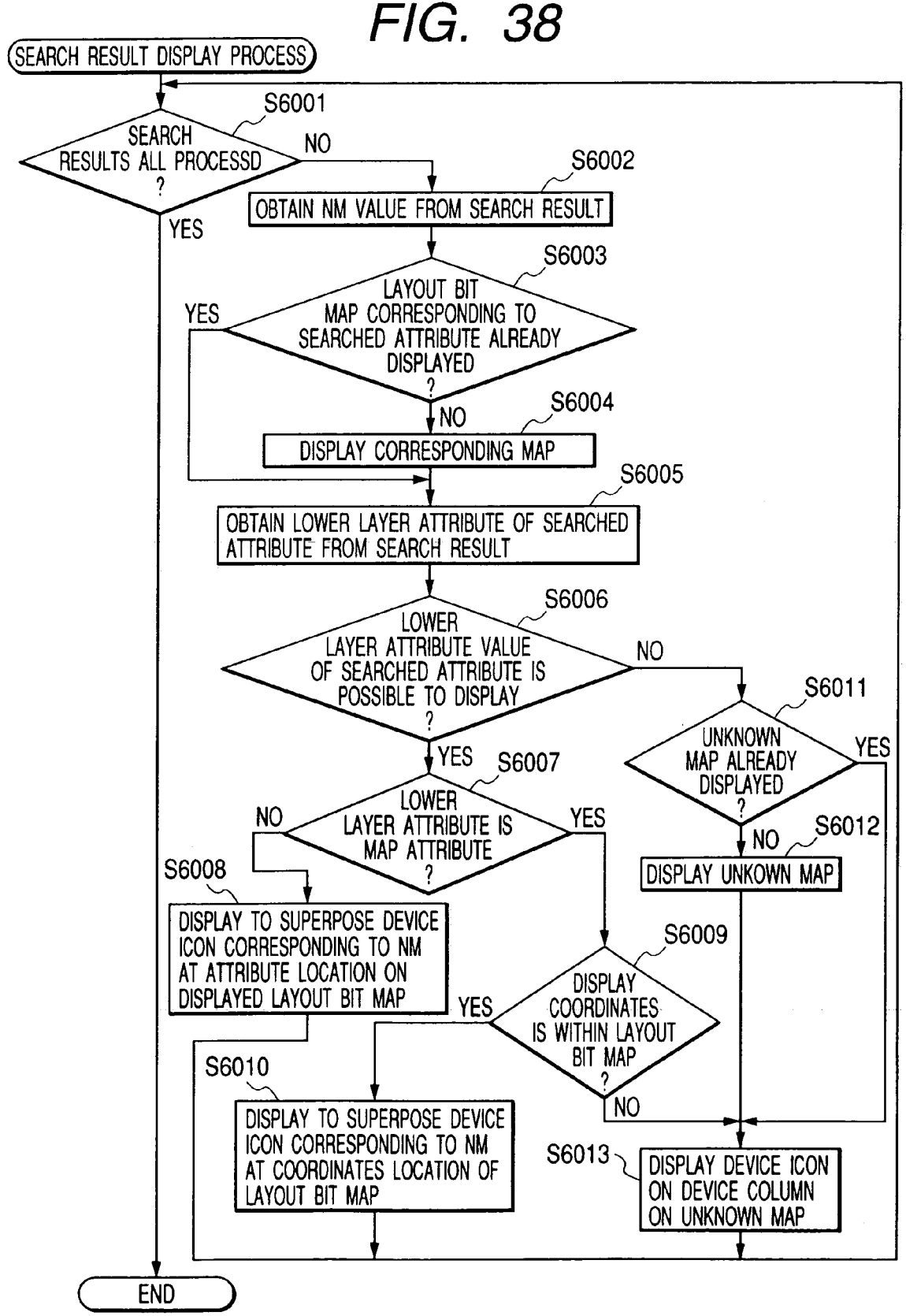
FIG. 38 is a flow chart illustrating the operation of a client according to the fourth embodiment.

This display process by the client is illustrated in the flow chart of FIG. 38.

First, as the display process starts, it is judged at Step S6001 whether all search results have been processed. The display process is repeated until all search results have been processed.

If it is judged at Step S6001 that all search results have not been processed, the attribute NM is derived from the next search result at Step S6002. This Step is executed so that the device icon can be displayed at Step S6008, S6010 or S6013.

Figure 39:
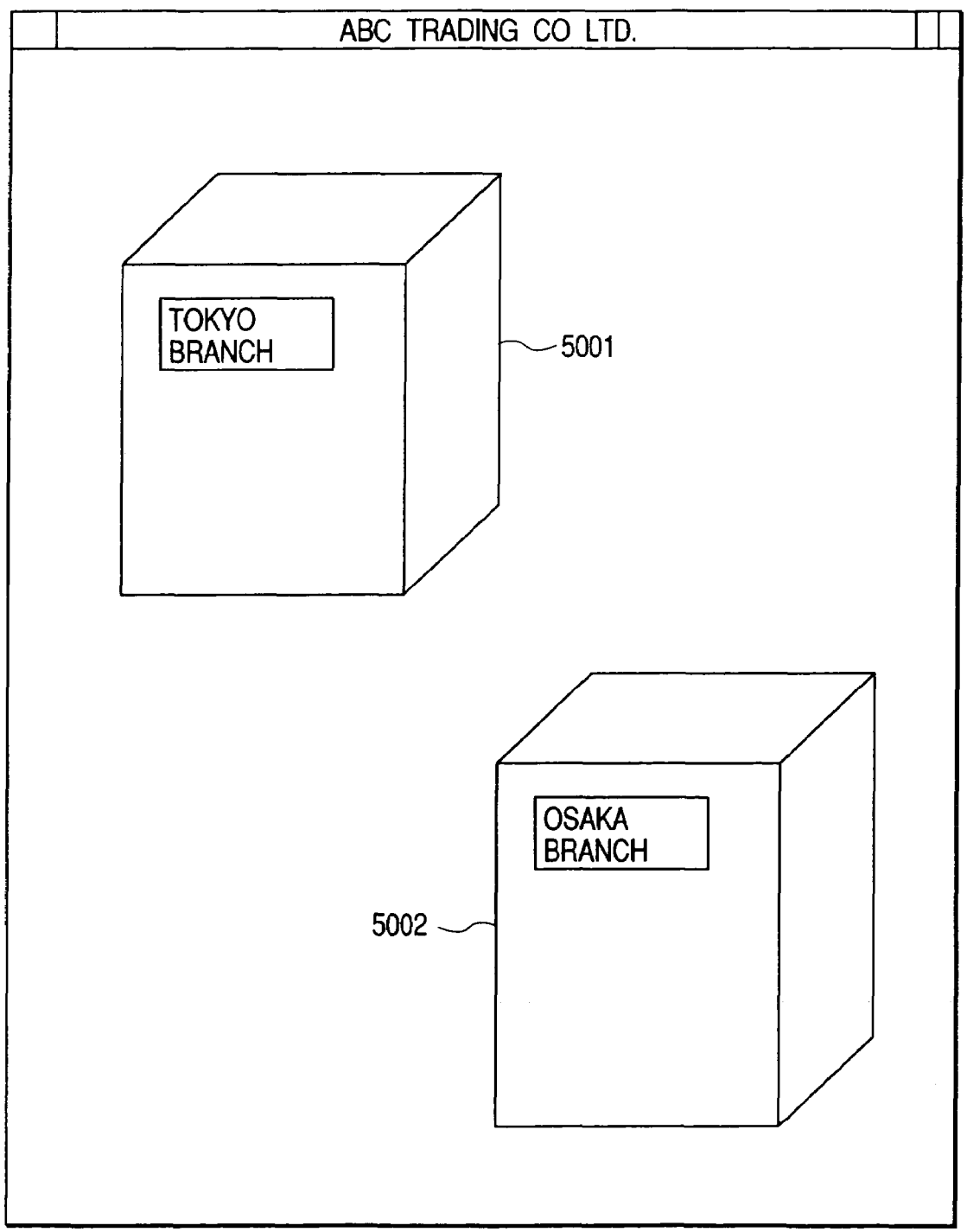
FIG. 39 is a diagram showing a layout bit map corresponding to a searched condition attribute according to the fourth embodiment of the invention.

Next, it is judged at Step S6003 whether the layout bit map corresponding to the searched condition attribute is already displayed. In this example, since the search was executed with the attribute O=attribute value ABC trading Co. Ltd., the searched device icon is displayed on the layout bit map shown in FIG. 39 in accordance with the map correspondence list (shown in FIG. 37). It is checked whether the layout bit map shown in FIG. 39 is already displayed. If not displayed, the layout bit map is displayed at Step S6004 to advance to the process at Step S6005.

If it is judged at Step S6003 that the layout bit map shown in FIG. 39 is already displayed, the attribute under the searched attribute and its attribute value are derived from the searched attribute at Step S6005. It is checked at Step S6006 whether the acquired attribute value can be displayed. If the device has an attribute value outside of the predetermined range or is not input with the attribute value, the device cannot be displayed and the flow advances to Step S6011.

It is judged at Step S6011 whether the unknown map is already displayed. If not, the unknown map is displayed at Step S6012, and the device icon corresponding to the NM value acquired at Step S6002 is displayed in the device column of the unknown map (Step S6013).

If it is judged at Step S6006 that the attribute value can be displayed, it is judged whether the lower hierarchical level is the MAP attribute (Step S6007). If not, the flow advances to Step S6008 whereat the device icon corresponding to the NM value acquired at Step S6002 is superposed upon the displayed layout bit map at the attribute position. In this case, the attribute value of the attribute BR one level lower than the hierarchical level (O) in the hierarchical location information is the Tokyo branch (FIG. 4), and so each device is displayed at the location of the Tokyo branch 5001. The display shown in FIG. 40 can therefore be obtained.

In order to search the location of the device more precisely, the user selects the block name (BL) from the pull-down menu at 1001*a* in the input window shown in FIG. 11, inputs 2-1 as its attribute value 1002*a*, and thereafter activates the search start button 1005.

The client acquires the search result from the server by the method described in the above embodiments. In accordance with the search result acquired from the server, the client displays the device icon on the layout bit map. Namely, the process shown in FIG. 38 is executed. In this case, since the lower hierarchical level attribute information is the map information at Step S6007, the flow advances to Step S6009.

It is checked at Step S6009 whether the coordinate is in the areal range of the layout bit map. If in the areal range, at Step 6010 the device icon corresponding to the NM value acquired at Step S6002 is displayed superposed upon the displayed layout bit map at the coordinate position.

In this case, since the search was executed with the attribute value of 2-1 as the block attribute (BL), the layout bit map shown in FIG. 18 is selected by using the map correspondence list shown in FIG. 37, as the layout bit map on which the search result is displayed.

Since the hierarchical level under BL of the hierarchical location information if the MAP hierarchical level (shown in FIG. 4), each searched device is displayed on this layout bit map at a corresponding coordinate position. Therefore, as shown in FIG. 5, the search result display is obtained.

Other layout bit maps prepared for respective hierarchical levels will be described.

As described earlier, FIG. 39 shows the layout bit map to be used for the search with the attribute O=attribute value ABC trading Co. Ltd. The device with the Tokyo branch as the attribute BR one level lower than the attribute O is displayed at 5001, and the device with the Osaka branch is displayed at 5002.

Figure 40:
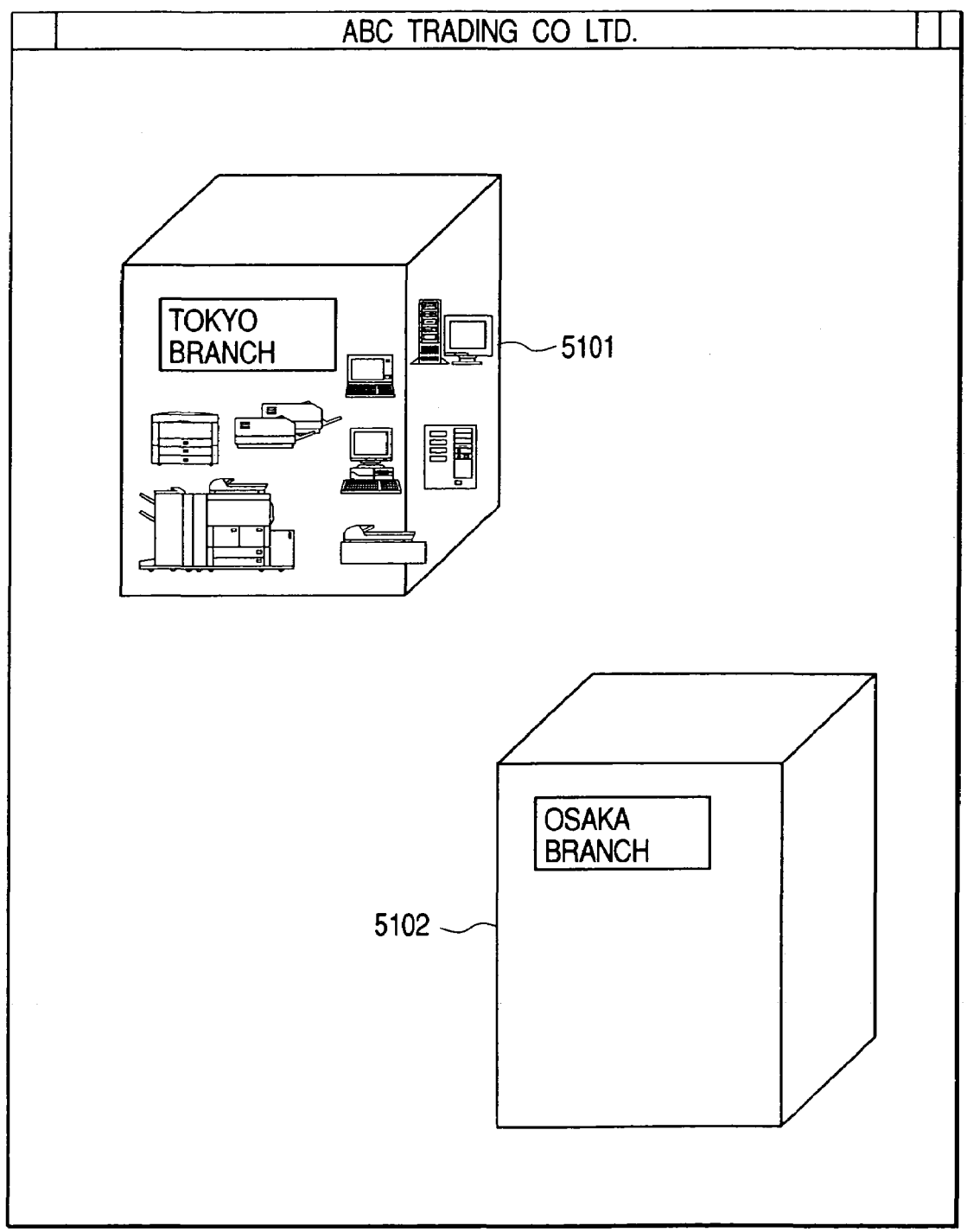
FIG. 40 is a diagram showing an example of displayed devices at locations in a Tokyo branch.

FIG. 40 shows the search result display when all devices are searched with the attribute O=attribute value ABC trading Co. Ltd.

Figure 41:
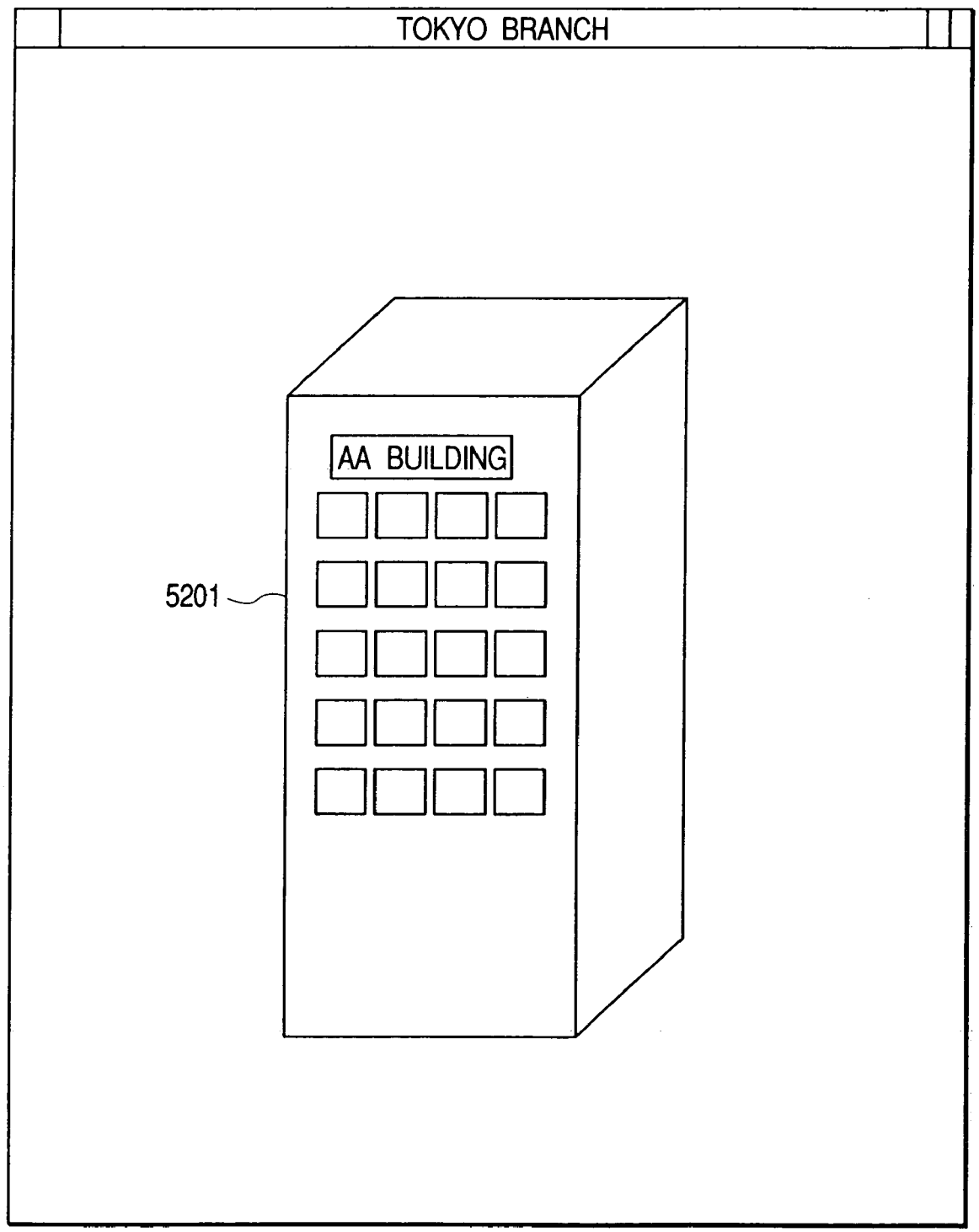
FIG. 41 is a diagram showing a layout bit map to be used for search with attribute BR=attribute value Tokyo branch, according to the fourth embodiment.

FIG. 41 is the layout bit map for the search with the attribute BR=attribute value Tokyo branch. The attribute one level under the attribute value BR is OP which is an option indicating that the detailed information exists at one lower level. The device having the AA building as its attribute BU is displayed at 5201.

Figure 42:
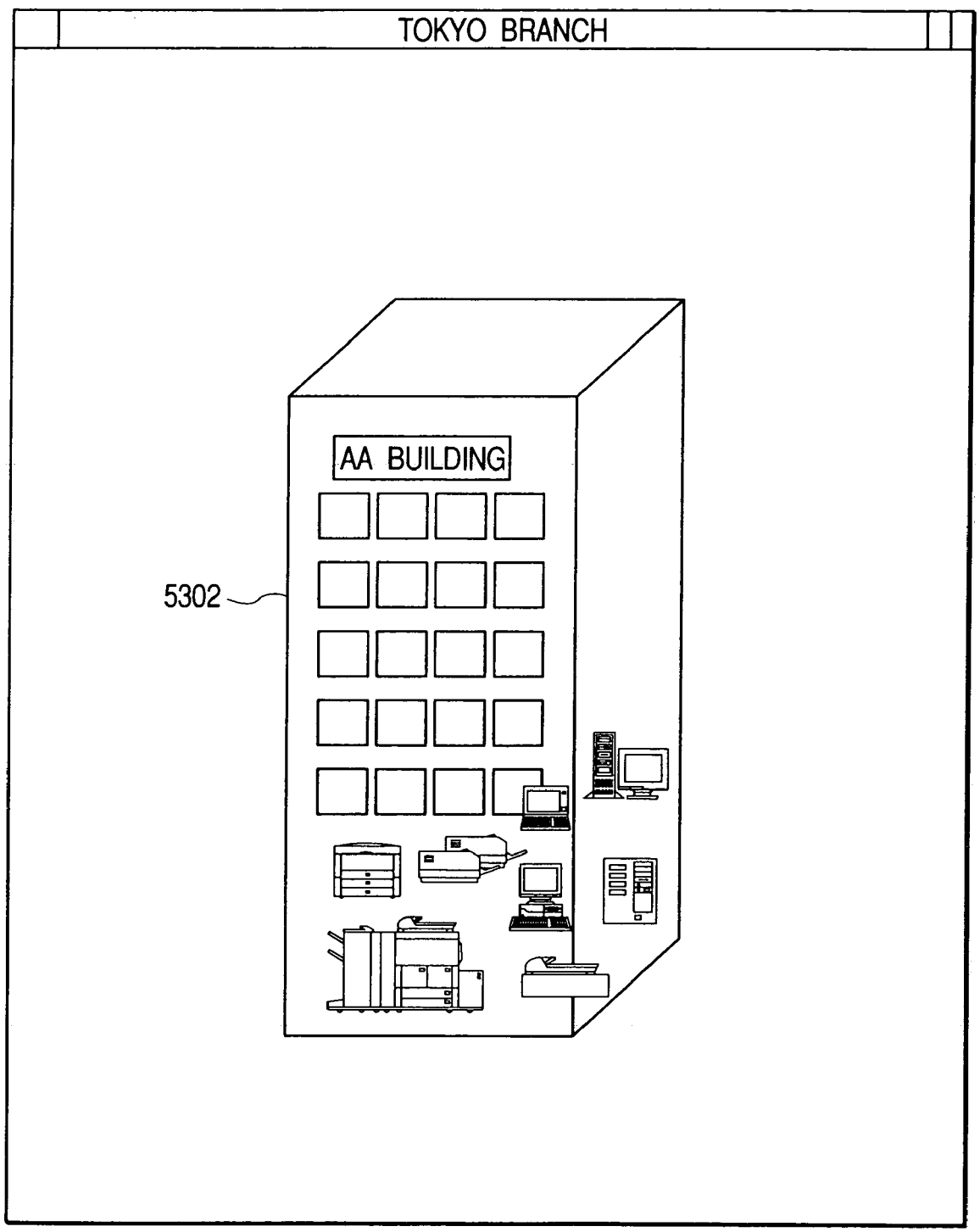
FIG. 42 is a diagram showing an example of the search result when all devices are searched with attribute BR=attribute value Tokyo branch, according to the fourth embodiment.

FIG. 42 shows the search result display showing a building 5302 when all devices are searched with the attribute BR=attribute value Tokyo branch.

Figure 43:
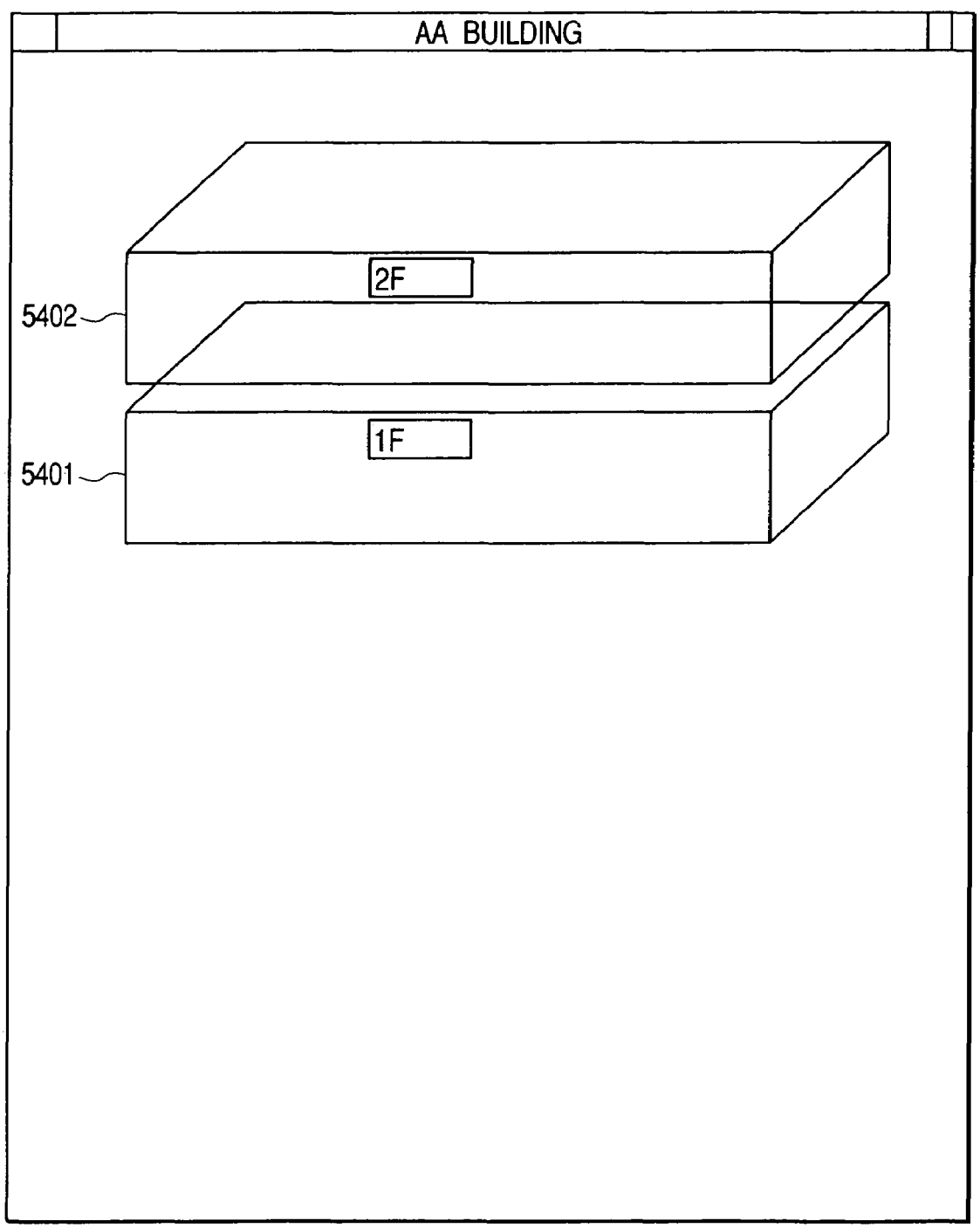
FIG. 43 is a diagram showing a layout bit map for search with attribute BU=attribute value AA building, according to the fourth embodiment.

FIG. 43 is the layout bit map for the search with the attribute BU=attribute value AA building. The device having 2F as the attribute 2F under the attribute BU is displayed at 5402, and the device having 1F is displayed at 5401.

Figure 44:
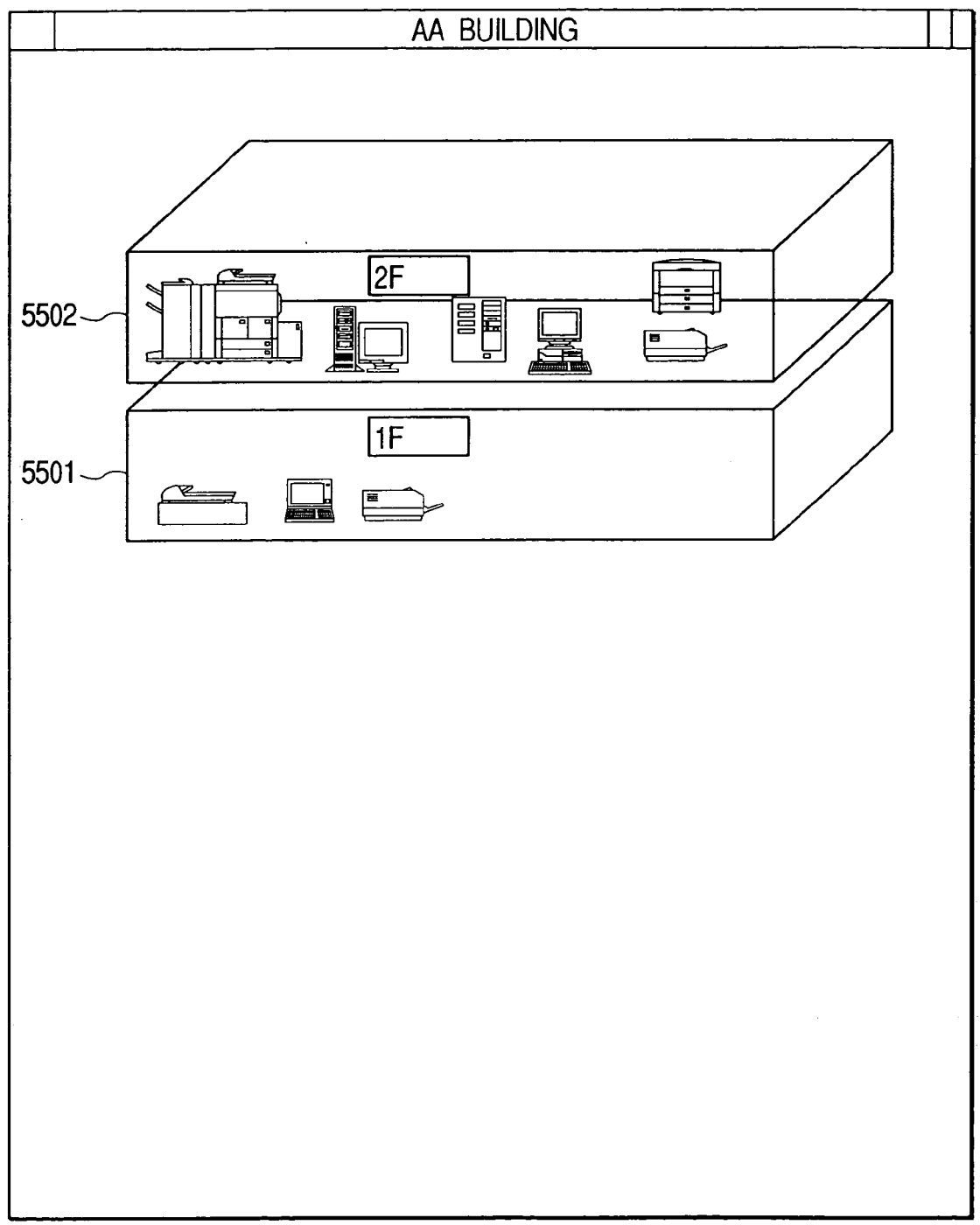
FIG. 44 is a diagram showing an example of the search result when all devices are searched with attribute BU=attribute value AA building, according to the fourth embodiment.

FIG. 44 shows the search result display when all devices are searched with the attribute BU=attribute value AA building. All devices in a 2F bit map 5502 and 1F bit map 5501 are displayed.

Figure 45:
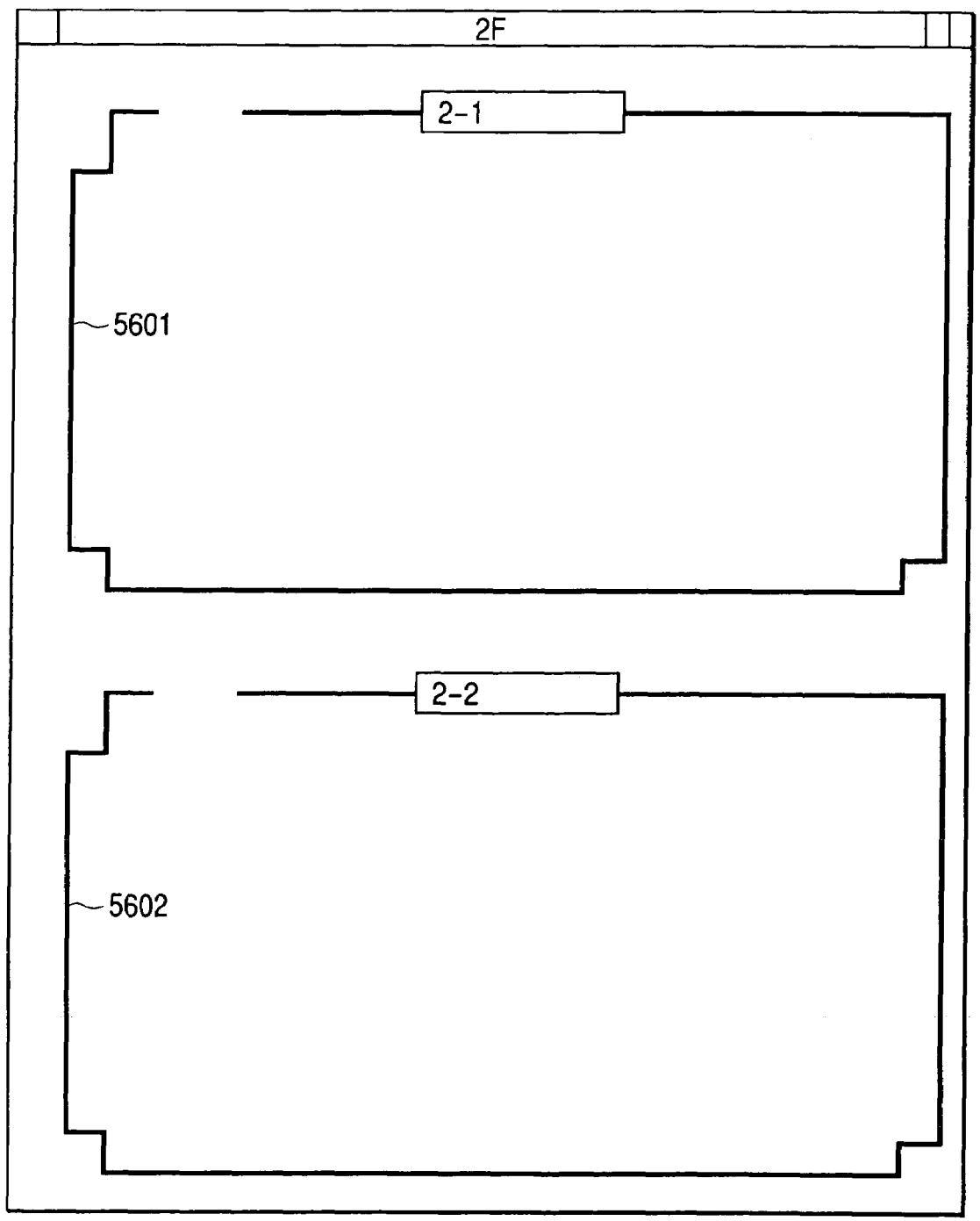
FIG. 45 is a diagram showing a layout bit map for search with attribute FL=attribute value 2F, according to the fourth embodiment.

FIG. 45 is the layout bit map for the search with the attribute FL=attribute value 2F. The device having 2-1 as the attribute BL under the attribute FL is displayed at 5601, and the device having 2-2 is displayed at 5602.

Figure 46:
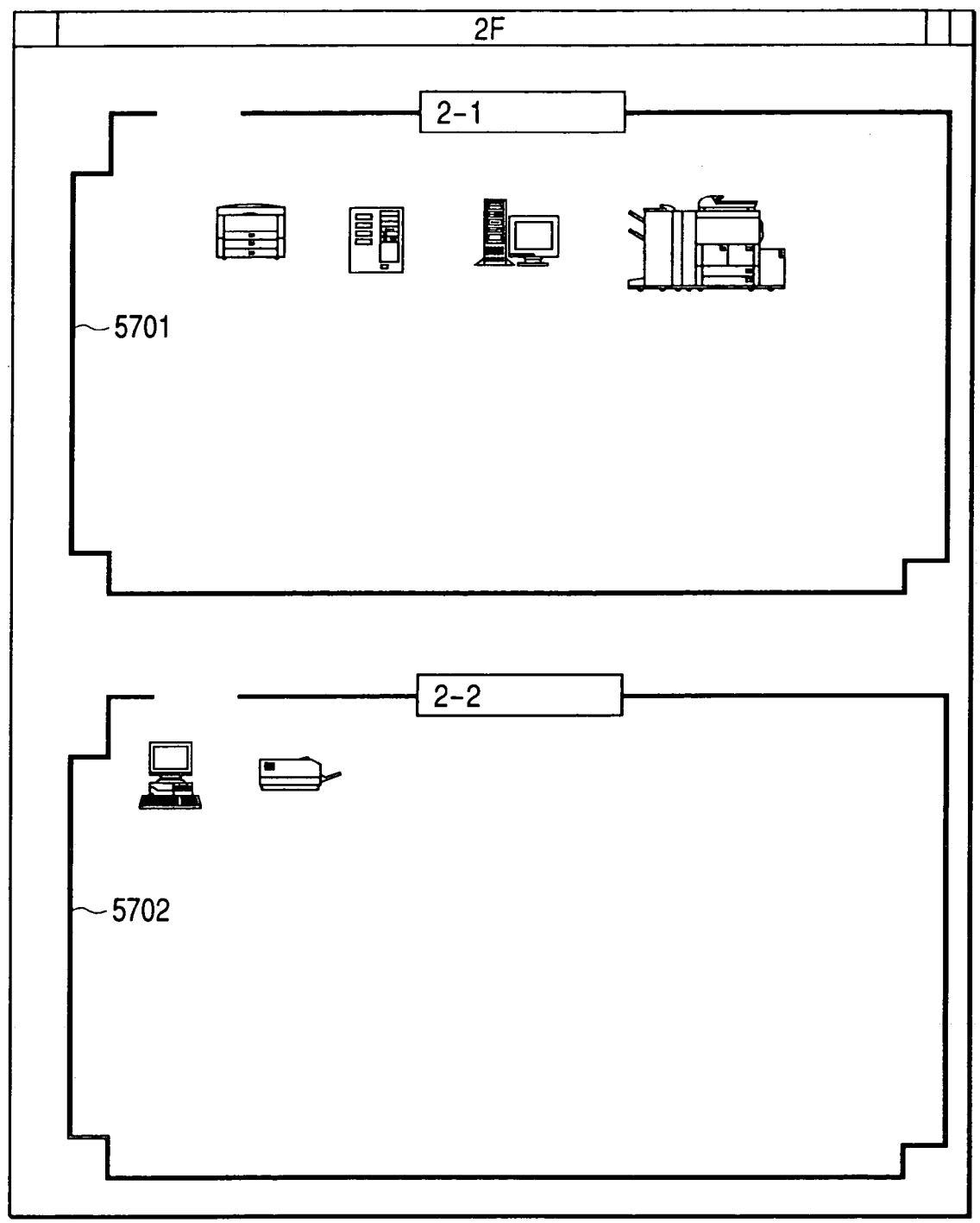
FIG. 46 is a diagram showing an example of the search result when all devices are searched with attribute FL=attribute value 2F, according to the fourth embodiment.

FIG. 46 shows the search result display when all devices are searched with the attribute FL=attribute value 2F. All devices on a 2F-1 bit map 5701 and a 2F-2 bit map 5702 are displayed.

Figure 47:
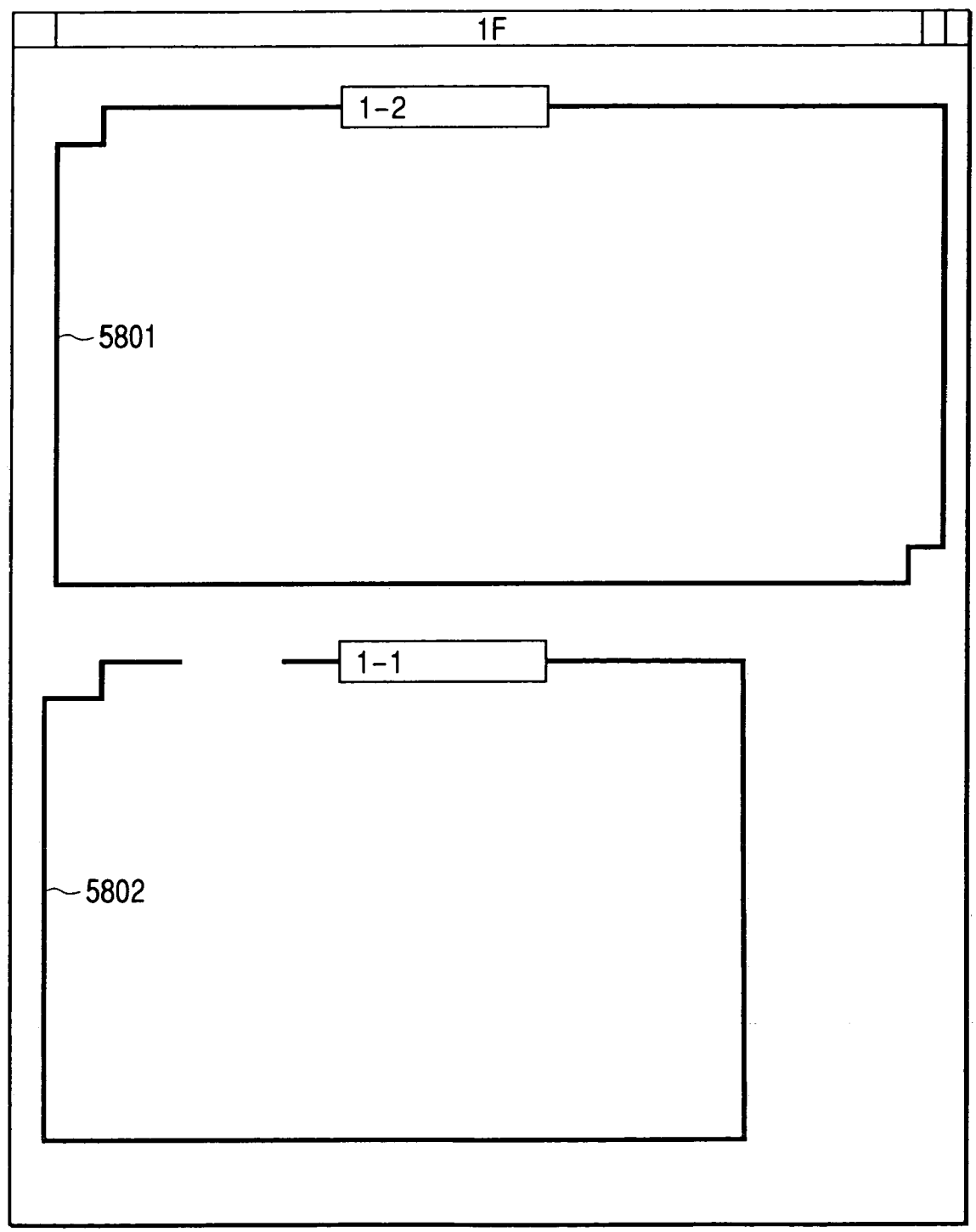
FIG. 47 is a diagram showing a layout bit map for search with attribute FL=attribute value 1F, according to the fourth embodiment.
Figure 48:
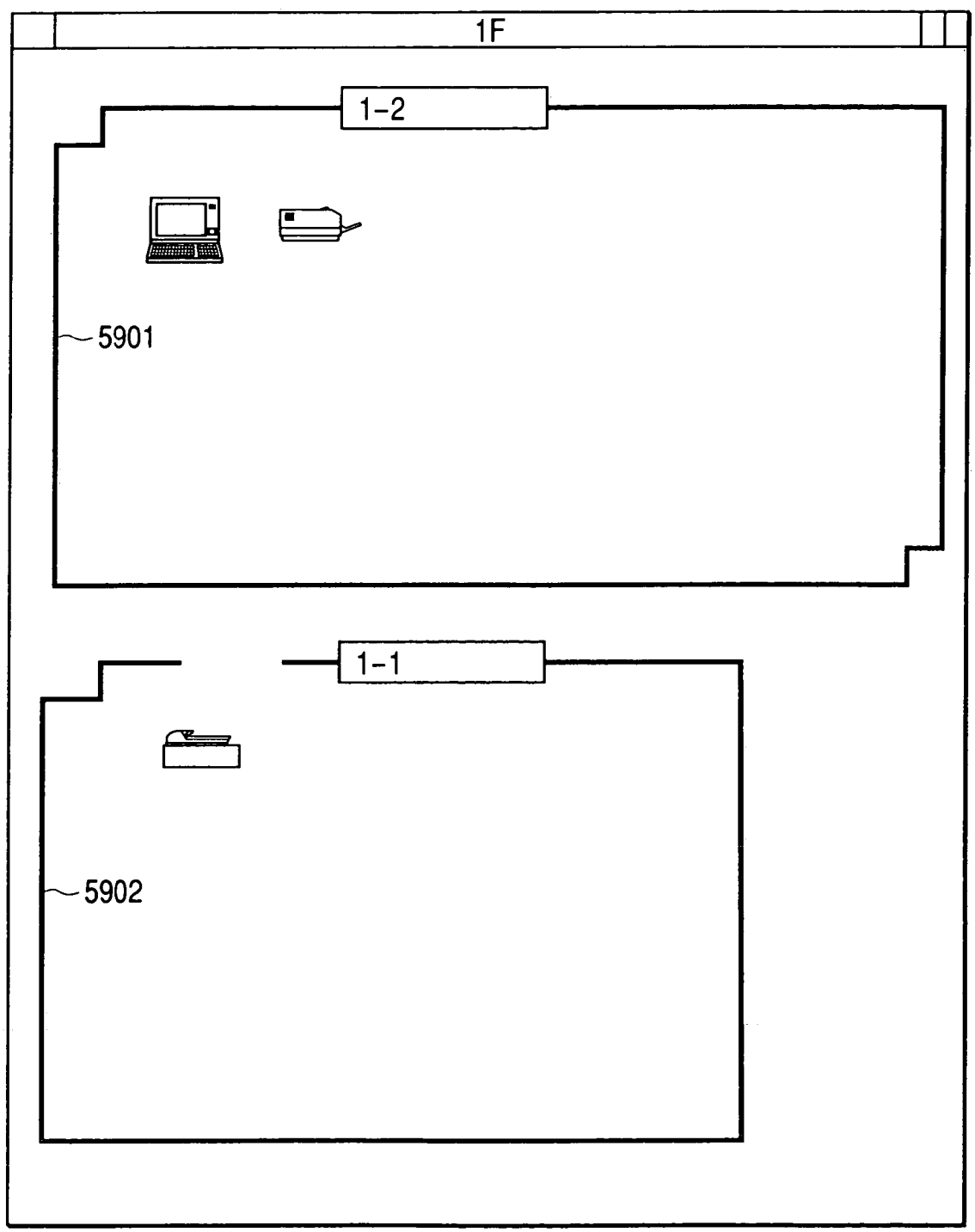
FIG. 48 is a diagram showing an example of the search result when all devices are searched with attribute FL=attribute value 1F, according to the fourth embodiment.

FIG. 47 is the layout bit map for the search with the attribute FL=attribute value 1F. FIG. 48 shows the search result display when all devices are searched with the attribute FL=attribute value 1F. The device having 1-2 as the attribute BL under the attribute FL is displayed on a bit map 5901 and the device having 1-1 is displayed on a bit map 5902.

As described above, in accordance with the search request level supplied by a user, the search and its display can be performed for each hierarchical level of the location information, including the rough display to detailed display.

Other Embodiments

The device search system described above may be realized by using techniques such as WWW techniques. In this case, the server 112 has a WWW server, a database function (DBMS), and a gateway function for interconnecting the WWW server and DBMS. The WWW server supplies a search window constituted of HTML or XML to the client.

The client displays the search window supplied from the WWW server by using browser software, and a user executes a device search by using the displayed search window.

Various data (maps, icons, and the like) transferred to and from the server, clients and devices is constituted of HTML, XML or the like, and HTTP is used as a data transfer protocol.

In order to realize a function not possessed by general browser software at the client, for example, Applet, one kind of JAVA techniques, may be used.

In the above embodiments, computers are used as the client 111 and server 112. The function of the client or the function of the server may be provided to the device such as a scanner, a facsimile and a printer.

For example, by providing a scanner with the function of the client 111, it becomes possible to know the state of a printer for printing original data read with the scanner or the state of a facsimile suitable for transmitting original data read with the scanner.

It is obvious that the object of the invention can be achieved by supplying a system or apparatus with a storage medium storing software program codes realizing the functions of each embodiment described above, and by reading and executing the programs codes stored in the storage medium by a computer (CPU or MPU) of the system and apparatus.

In such a case, the program codes themselves read from the storage medium realize the functions of each embodiment. Therefore, the program code themselves and means for supplying the program codes to a computer, e.g., a storage medium storing such program codes, constitute the present invention.

The storage medium for storing such program codes may be a floppy disk, a hard disk, an optical disk, a magnetooptical disk, a CD-ROM, a magnetic tape, a nonvolatile memory card, a ROM or the like.

The device control program on the network of this invention may be executed by PC 200 in accordance with an externally installed program. In this case, the program is loaded on PC 200 by using a storage medium such as a CD-ROM, a flash memory and a floppy disk, or via a network such as an electronic mail to constitute the present invention.

Figure 29:
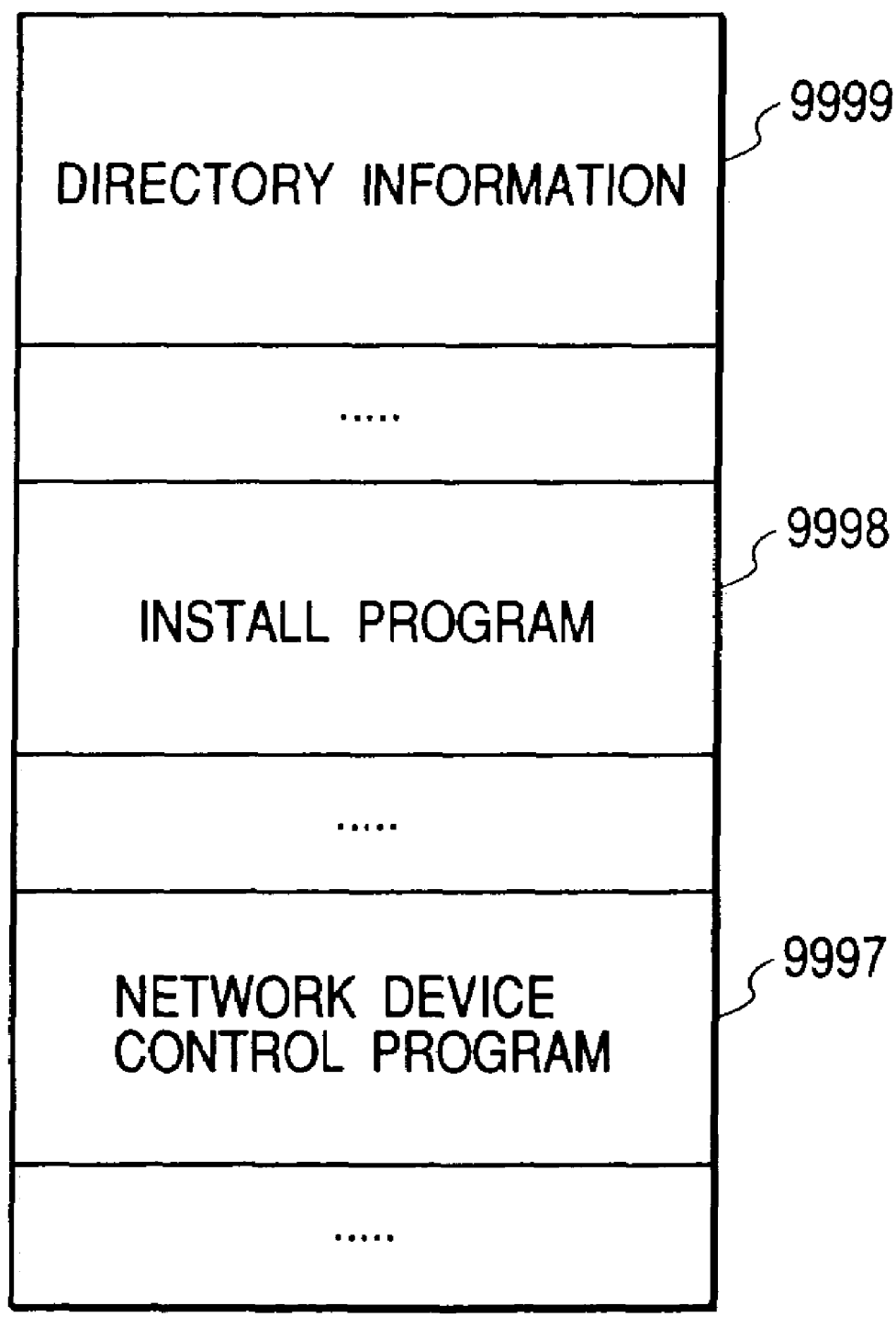
FIG. 29 is a diagram showing a memory map of a CD ROM.

For example, FIG. 29 shows a memory map of a CD-ROM as an example of the storage medium.

In FIG. 29, reference numeral 9999 represents an area storing directory information which indicates the location of an area 9998 storing installing programs and an area 9997 storing network device control programs.

The area 9998 stores the installing programs. The area 9997 stores the network device control programs. When the network device control programs are to be installed in PC 200, the installing programs stored in the area 9998 are loaded in the system and executed by CPU 202.

The installing programs executed by CPU 202 read the network device control programs from the area 9997 and load them in the hard disk 211.

It is obvious that the scope of the invention also contains not only the case wherein the functions of each embodiment can be realized by executing the program codes read by a computer, but also the case wherein the functions of each embodiment can be realized by executing a portion or the whole of processes by an OS (operating system) running on the computer or other application software, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

What is claimed is:

1. An information processing apparatus, comprising:
   a transmission unit that transmits device attribute information input by a user to search for a desired device;
   a reception unit that receives, as search results, device information of at least one device satisfying the device attribute information transmitted by said transmission unit;
   a first display unit that displays icons respectively corresponding to a device of the device information received as the search results by said reception unit;
   a second display unit that displays a map which represents a layout of a location in a first hierarchy;
   an acquisition unit that acquires, as an icon displayed by said first display unit is shifted onto the map displayed by said second display unit, coordinate information representing the location of the icon on the map, first location information in the first hierarchy represented by the map, and second location information in a second hierarchy superior to the first hierarchy and registered into the map; and
   a registration unit that registers the coordinate information, the first location information and the second location information which are acquired by said acquisition unit, to the device.

2. An information processing apparatus according to claim 1, further comprising a holding unit that holds respective map data of the first and second hierarchies.

3. An information processing apparatus according to claim 1, wherein said first display unit discriminably displays whether or not the first and second location information has been registered for each device.

4. An information processing apparatus according to claim 1, wherein
   said first display unit displays the icon of the device, from among the devices, for which the first and second location information has been registered, at a predetermined location on the map, and
   said first display unit displays the icon of the device, from among the devices, for which the first and second location information is not registered, at a predetermined location other than on the map.

5. An information processing apparatus according to claim 4, wherein the predetermined location on the map where the icon of the device is displayed is determined based on the first and second location information of said device.

6. An information processing apparatus according to claim 4, further comprising a change unit that changes, according to the icon displayed at the predetermined location on the map being shifted, the first and second location information of the device corresponding to said icon based on the shifted location on the map.

7. An information processing apparatus according to claim 1, wherein the device is any one of a printer, a scanner, a copying machine and a facsimile machine.

8. An information processing method, comprising the steps of:
- a transmitting step of transmitting device attribute information input by a user to search for a desired device;
- a reception step of receiving, as search results, device information of at least one device satisfying the device attribute information transmitted by the transmitting step;
- a first display step of displaying icons respectively corresponding to a device of the device information received as the search results by the reception step;
- a second display step of displaying a map which represents a layout of a location in a first hierarchy;
- an acquisition step of acquiring, as an icon displayed by said first display step is shifted onto the map displayed by said second display step, coordinate information representing the location of the icon on the map, first location information in the first hierarchy represented by the map, and second location information in a second hierarchy superior to the first hierarchy and registered into the map; and
- a registration step of registering the coordinate information, the first location information and the second location information which are acquired by said acquisition step, to the device.

9. A computer-readable medium on which are stored program codes, which when executed by a computer, cause the computer to perform an information processing method, the method comprising the steps of:
- a transmitting step of transmitting device attribute information input by a user to search for a desired device;
- a reception step of receiving, as search results, device information of at least one device satisfying the device attribute information transmitted by the transmitting step;
- a first display step of displaying icons respectively corresponding a device of the device information received as the search results by the reception step;
- a second display step of displaying a map which represents a layout of a location in a first hierarchy;
- an acquisition step of acquiring, as an icon displayed by said first display step is shifted onto the map displayed by said second display step, coordinate information representing the location of the icon on the map, first location information in the first hierarchy represented by the map, and second location information in a second hierarchy superior to the first hierarchy and registered into the map; and
- a registration step of registering the coordinate information, the first location information and the second location information which are acquired by said acquisition step, to the device.

* * * * *

UNITED STATES PATENT AND TRADEMARK OFFICE
CERTIFICATE OF CORRECTION

PATENT NO. : 7,237,015 B1  Page 1 of 1
APPLICATION NO. : 09/612946
DATED : June 26, 2007
INVENTOR(S) : Ochiai et al.

It is certified that error appears in the above-identified patent and that said Letters Patent is hereby corrected as shown below:

COVER PAGE:
Item (57) ABSTRACT, Line 11, "exists," should read -- exist, --; and
Line 14, "server" should read -- server --.

SHEET 7:
Fig. 39, In Reference Numeral 803, "SCANER" should read -- SCANNER --.

SHEET 29:
Fig. 36, In Reference Numeral 803, "SCANER" should read -- SCANNER --.

SHEET 31:
Fig. 38, In Step S6001, "PROCESSD" should read -- PROCESSED --; and
In Step S6009, "IS WITHIN LAYOUT" should read -- ARE WITHIN LAYOUT --.

SHEET 42:
Fig. 49, S4905, "UNKOWN" should read -- UNKNOWN --.

COLUMN 17:
Line 8, "trading" should read -- trading --; and
Line 30, "trading" should read -- trading --.

COLUMN 18:
Line 25, "trading" should read -- trading --.

COLUMN 22:
Line 12, "responding" should read -- responding to --.

Signed and Sealed this

Twenty-fourth Day of June, 2008

JON W. DUDAS
*Director of the United States Patent and Trademark Office*